(12) United States Patent
McGinn et al.

(10) Patent No.: US 11,784,872 B1
(45) Date of Patent: Oct. 10, 2023

(54) SUPPRESSING MESSAGES TO AN OUT-OF-SERVICE SERVER

(71) Applicant: T-Mobile USA, Inc., Bellevue, WA (US)

(72) Inventors: Ryan J. McGinn, Shawnee, KS (US); Henry Delgado, Centreville, VA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 17/302,631

(22) Filed: May 7, 2021

(51) Int. Cl.
*H04L 41/0659* (2022.01)
*H04L 65/1045* (2022.01)

(52) U.S. Cl.
CPC ...... *H04L 41/0659* (2013.01); *H04L 65/1045* (2022.05)

(58) Field of Classification Search
None
See application file for complete search history.

(56) References Cited

U.S. PATENT DOCUMENTS

| | | | |
|---|---|---|---|
| 6,721,898 B1* | 4/2004 | Hasha | H05B 47/18 712/E9.084 |
| 9,830,214 B1 | 11/2017 | McGinn et al. | |
| 2003/0131141 A1* | 7/2003 | Springmeyer | G06F 8/38 709/225 |
| 2010/0054239 A1* | 3/2010 | Torres | H04L 65/1094 370/352 |
| 2014/0003431 A1 | 1/2014 | Mann et al. | |
| 2014/0140198 A1 | 5/2014 | Kaushal | |
| 2017/0125021 A1 | 5/2017 | Garre | |
| 2018/0241615 A1 | 8/2018 | Livanos | |
| 2018/0288648 A1 | 10/2018 | Juneja | |
| 2019/0342422 A1* | 11/2019 | Li | H04L 41/085 |
| 2020/0029388 A1 | 1/2020 | Dao et al. | |
| 2020/0068449 A1 | 2/2020 | Jin et al. | |
| 2020/0137056 A1 | 4/2020 | Havaralu Rama Chandra Adiga et al. | |
| 2021/0218646 A1* | 7/2021 | Dey | H04L 67/1078 |
| 2021/0258406 A1 | 8/2021 | Irfan et al. | |
| 2021/0329485 A1 | 10/2021 | Han et al. | |

(Continued)

OTHER PUBLICATIONS

Office Action for U.S. Appl. No. 17/302,629, dated Jun. 10, 2022, Delgado "Providing Out-of-Service Notifications Regarding a Server", 17 pages.

(Continued)

*Primary Examiner* — Mohamed Ibrahim
(74) *Attorney, Agent, or Firm* — Lee & Hayes, P.C.

(57) ABSTRACT

Techniques and systems for suppressing messages destined for a server device that is at least partially out-of-service are disclosed. An example process performed by a client device, such as a PCRF or a PCF, may include sending a message to a server device, such as a PGW or a SMF, receiving, in response to the sending of the message to the server device, a notification indicating that the server device is at least partially out of service, and refraining, based at least in part on the receiving of the notification, from sending one or more messages to the server device until the client device is notified that the server device is back in service. Suppressing messages in this manner reduces extraneous traffic in the network to conserve computing resources (e.g., network bandwidth resources).

15 Claims, 10 Drawing Sheets

(56) References Cited

U.S. PATENT DOCUMENTS

2022/0014944 A1   1/2022  Liang

OTHER PUBLICATIONS

Office Action for U.S. Appl. No. 17/302,629, dated Jan. 6, 2023, Henry Delgado, "Providing Out-of-Service Notifications Regarding a Server", 15 pages.
Office Action for U.S. Appl. No. 17/302,629, dated May 11, 2023, Inventor #1 Henry Delgado, "Providing Out-of-Service Notifications Regarding a Server," 7 pages.

* cited by examiner

SUPPRESSING MESSAGES TO AN OUT-OF-SERVICE SERVER

BACKGROUND

Many networks utilize server devices. For example, a Packet Data Network Gateway (PGW) is configured to function as a server device in a 4th Generation (4G) Long Term Evolution (LTE) network. In this type of network, a policy and charging rules function (PCRF) is configured to function as a client device with respect to the PGW (server). For instance, the PCRF is configured to transmit messages to a designated PGW, such as Re-Authenticate-Requests (RARs) for setting up a communication session (e.g., a Voice over LTE (VoLTE) call). Although today's telecommunications networks are fairly reliable, it is possible for servers, such as PGWs, to go out of service. For example, maintenance activities relating to a PGW may take the PGW offline for a period of time while the PGW is serviced (e.g., to upgrade software, install a patch file, etc.). As another example, a PGW may unexpectedly fail, such as when a hardware component of the PGW fails, or when data used by the PGW becomes corrupted. In some instances, a PGW can be partially, but not completely, out of service. For example, control plane communication associated with the PGW may be unavailable whilst bearer communication associated with the PGW remains available.

An out-of-service PGW causes end-user sessions to be terminated and subsequently reestablished on an in-service PGW. However, this recovery process is not without issues. For example, race conditions can occur, causing the out-of-service condition of the PGW to go undetected for a period of time, thereby permitting messages to be sent to the out-of-service PGW, and preventing the timely reestablishment of the affected session(s). In an illustrative example, a PCRF will continue to send messages (e.g., RARs) to an out-of-service PGW in a series of attempts to setup (or tear down) communication sessions (e.g., VoLTE calls) because the PCRF is unable to detect an out-of-service condition of the PGW. This may also occur in the midst of a long session when the PCRF sends a message to an out-of-service PGW to determine if the session is still active. In either scenario, the continued transmission of messages to an out-of-service PGW creates extraneous traffic in the network, which serves no useful purpose and which unnecessarily consumes network bandwidth.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

DETAILED DESCRIPTION

Figure 1:
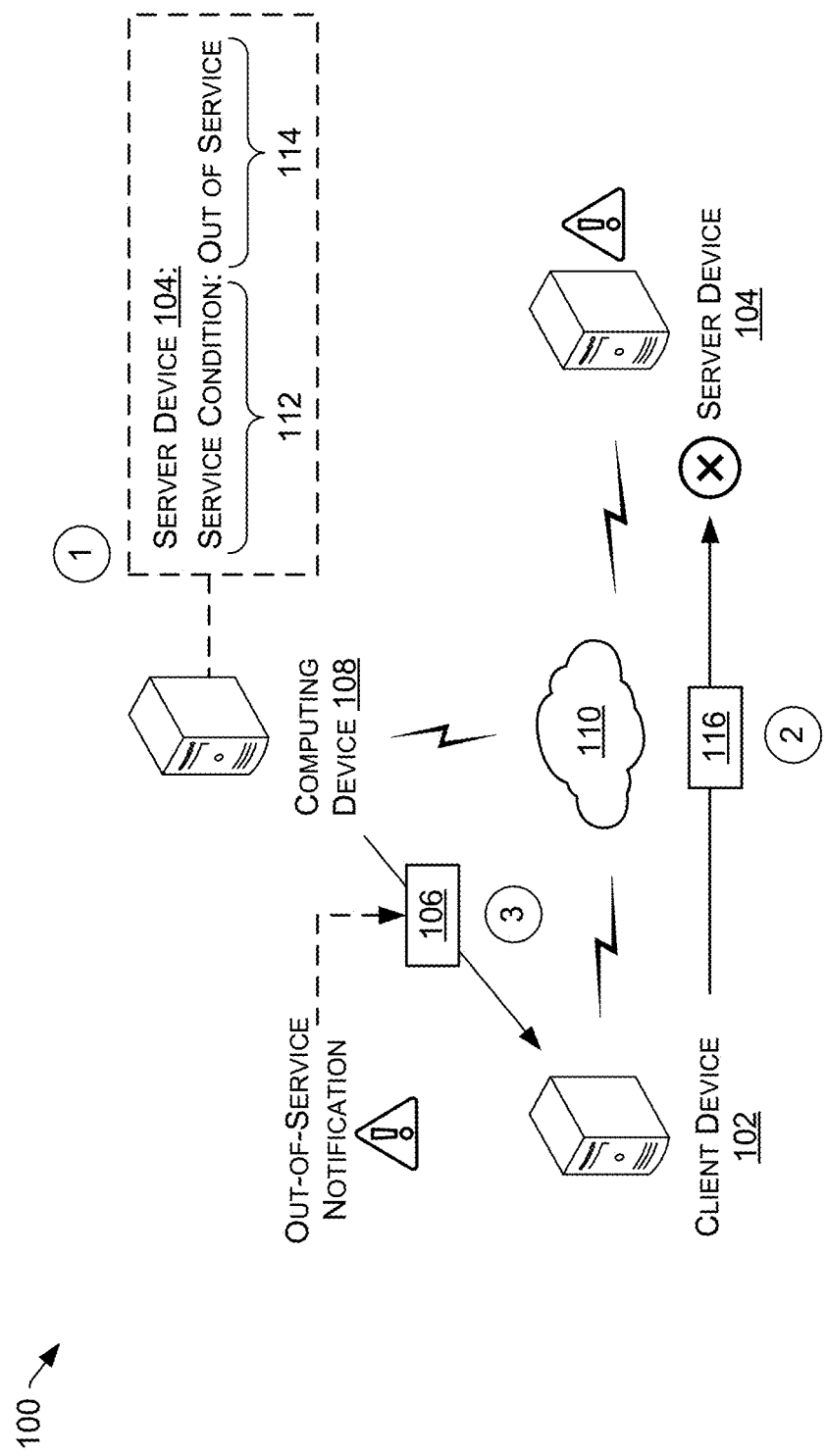
FIG. 1 illustrates a system including a client device and a server device, and a technique for providing, to the client device, out-of-service notifications regarding the server device.

Described herein are techniques and systems for notifying a client device regarding a server device that is at least partially out of service. In this way, the client device (and/or other devices in communication with the client device) can take appropriate action based on the out-of-service condition of the server device. Also described herein are techniques and systems for suppressing messages destined for a server device that is at least partially out-of-service, thereby reducing, if not eliminating, extraneous traffic in the network to conserve computing resources (e.g., network bandwidth resources). Although examples are described herein with respect to components of 4G LTE and 5G NR networks, it is to be appreciated that the techniques and systems described herein are not limited to 4G and 5G implementations, and are applicable to any client-server architecture utilizing any existing or future Internet Protocol (IP)-based network technology or evolution of an existing IP-based network technology. For example, the techniques and systems described herein are also applicable to Internet of things (IoT) devices and systems.

An example process for providing an out-of-service notification regarding a server device, which may be implemented by a computing device(s), can include determining that a server device is at least partially out of service, and setting a flag to a value indicative of the server device being at least partially out of service. The process may further include determining that a client device sent a message to the server device, and sending, to the client device, in response to the determining that the client device sent the message to the server device, and based at least in part on the value of the flag, a notification indicating that the server device is at least partially out of service.

In some embodiments, the client device and the server device may be nodes of a core network (e.g., an Internet Protocol Multimedia Subsystem (IMS) core) of a telecommunication service provider. In an illustrative example, a PCRF or a PCF may operate as a client device with respect to a PGW or a SMF, respectively, which operates as a server device, depending on whether a 4G or a 5G network is being utilized. A computing device(s), such as a Diameter routing agent (DRA), a watchdog device, or a network repository function (NRF), may be configured to set a flag responsive to a determination that the PGW or the SMF has gone at least partially out of service. The flag may be set to a value (e.g., a first value of multiple values) indicative of the server device being at least partially out of service. Furthermore, responsive to a determination that the PCRF or the PCF has sent a message to the out-of-service PGW or SMF, respectively, the computing device(s) may send a notification to the PCRF or the PCF indicating the out-of-service condition of the server device, which is based at least in part on the value of the flag. In this manner, the client device (e.g., the PCRF or the PCF), upon receiving the out-of-service notification, can take appropriate action. An example action taken by the client device (e.g., the PCRF or the PCF) may be to suppress messages destined for the server device (e.g., the PGW or the SMF), at least until the server device (e.g., the PGW or the SMF) returns to service. When the computing device determines that the server device (e.g., the PGW or the SMF) is back in service, the computing device(s) may set the flag to a second value, or otherwise remove or clear the flag, to indicate that the server device (e.g., the PGW or the SMF) is back in service, and may send a second notification to the client device (e.g., the PCRF or the PCF) indicating that the server device (e.g., the PGW or the SMF) is back in service. In this way, the client device (e.g., the PCRF or the PCF) can resume normal operation upon receiving the in-service notification regarding the server device (e.g., the PGW or the SMF), such as by resuming message transmissions to the server device (e.g., the PGW or the SMF).

Notifying a client device when a server device has gone at least partially out of service allows the client device to take appropriate action, such as suppressing messages to the out-of-service server device, notifying other (e.g., downstream, upstream, etc.) devices about the server outage, and/or similar actions. At least some of these actions may conserve computing resources, such as by conserving networking resources by reducing, if not eliminating, extraneous network traffic as a result of suppressing messages destined for an out-of-service server device. In addition, notifying the client device when the server device returns to service allows for resuming sessions on the server device, instead of permanently designating the server device as a "failed server" in instances where the server device returns to service.

An example process for suppressing messages destined for an out-of-service server device, which may be implemented by a client device(s), can include sending a message to the server device, receiving, in response to the sending of the message to the server device, a notification indicating that the server device is at least partially out of service, and refraining, based at least in part on the receiving of the notification, from sending one or more messages to the server device until the client device is notified that the server device is back in service.

In some embodiments, the client device and the server device may be nodes of a core network (e.g., the IMS core) of a telecommunication service provider. In an illustrative example, a PCRF or a PCF may operate as a client device with respect to a PGW or a SMF, respectively, which operates as a server device, depending on whether a 4G or a 5G network is being utilized. The client device (e.g., the PCRF or the PCF) may receive a notification (e.g., from a DRA, a watchdog device, or a NRF) in response to sending a message destined for the server device (e.g., the PGW or the SMF). The received notification may indicate that the server device (e.g., the PGW or the SMF) is at least partially out of service. Based at least in part on receiving this out-of-service notification, the client device (e.g., the PCRF or the PCF) may suppress (e.g., refrain from sending, stop sending, not attempt to send, etc.) one or more messages destined for the out-of-service server device (e.g., the PGW or the SMF). The suppression of messages from the client device (e.g., the PCRF or the PCF) to the out-of-service server device (e.g., the PGW or the SMF) reduces the amount of extraneous traffic in the network, thereby conserving network bandwidth, among other computing resources. In some embodiments, the client device (e.g., the PCRF or the PCF) can send an error code to a proxy call session control function (P-CSCF) node so that the IMS core recognizes the out-of-service condition of the server device (e.g., the PGW or the SMF) as soon as the error code is received by the P-CSCF node. Such an error code can be stored and used subsequently (e.g., at a later date) by a performance monitoring group(s) for network (e.g., server, gateway, etc.) failure and recovery analysis to further improve network operability, and/or the error code can be used in real-time to restore a session on an in-service server device (e.g., an in-service PGW or SMF) more quickly.

As noted above, temporary suppression of messages to an out-of-service server device until the server device returns to service has many technical benefits. Firstly, it reduces extraneous network traffic, thereby conserving network bandwidth in a network (e.g., a telecommunications network). Secondly, the subsequent resumption of message transmission to the server device if and when the server device returns to service allows for efficient utilization of network resources (e.g., by eliminating assumptions of a permanent outage or an otherwise relatively serious problem), and it allows for more evenly distributing load across the network in a dynamic fashion. Furthermore, notification of a server outage can increase the analytical success rate in determining the cause of the server outage, and may lead to expediting the identification of the network error condition(s). In addition, notification to other (e.g., downstream, upstream, etc.) devices about a server outage allows for finding and utilizing a different, in-service server device sooner, and shortly after the out-of-service condition of the server device is detected, thereby improving network reliability.

The techniques, devices, and systems described herein may allow one or more devices to conserve resources with respect to processing resources, memory resources, networking resources, power resources, etc., in other ways described herein. Also disclosed herein are systems and devices comprising one or more processors and one or more memories, as well as non-transitory computer-readable media storing computer-executable instructions that, when executed, by one or more processors perform various acts and/or processes disclosed herein.

FIG. 1 illustrates a system 100 including a client device 102 and a server device 104, and a technique for providing, to the client device 102, out-of-service notifications 106 regarding the server device 104. The system 100 may also include a computing device 108 that is different from the client device 102 and the server device 104. The client device 102, the server device 104, and the computing device 108 may be configured to communicate with each other over a network 110, such as by sending and/or receiving data, messages, etc. The network 110 may represent any suitable network or combination of networks, such as a wide area communication network ("WAN") (e.g., the Internet), a cellular network, a telecommunications network, an intranet or an Internet service provider ("ISP") network, etc. In some examples, the network 110 may be implemented as an IoT network, a 4G LTE network, a 5G NR network, or any other suitable type of network. Specific examples involving 4G LTE networks and 5G NR networks are provided herein. It is to be appreciated, however, that the network 110 is not so limited.

In some examples, the computing device 108 may represent an intermediary device through which the client device 102 communicates with the server device 104, and vice versa. For example, the computing device 108 may route messages between the client device 102 and the server device 104. In some examples, the computing device 108 may represent a device that monitors the operability, connectivity, or the like, of the client device 102 and/or the server device 104. For example, the computing device 108 may monitor the messages transmitted between the client device 102 and the server device 104 without necessarily being an intermediary device that receives and routes those messages.

The computing device 108 may be configured to determine whether the server device 104 is "in service" (e.g., functional, operating properly, available, online, etc.) or partially or completely "out of service" (e.g., non-functional, operating improperly, unavailable, offline, etc.). "In service" and "out of service" are examples of service conditions of the server device 104. The computing device 108 may determine the service condition of the server device 104 by virtue of being communicatively coupled to the network 110 to which the server device 104 is also communicatively coupled. For example, the computing device 108 may represent, or may utilize, a watchdog device that uses "keepalive" functionality to periodically "check" on the service condition of the server device 104. In one example, the server device 104 may be configured to periodically (e.g., every few seconds, minutes, etc.) send a message to the computing device 108 and/or modify a file that is accessible to the computing device 108 to let the computing device 108 know that the server device 104 is in service. In another example, the computing device 108 may be configured to periodically (e.g., every few seconds, minutes, etc.) send a request/message to the server device 104 to prompt a response/answer from the server device 104 (e.g., a polling technique, request-and-answer technique, etc.). If an expected event (e.g., message transmission, file modification, etc.) does not occur within a predetermined period of time (e.g., within a timeout, such as a period of 5 seconds, 15 seconds, 30 seconds, one minute, etc.) of a scheduled time, the computing device 108 may determine that the server device 104 is out of service, at least partially. For example, the server device 104 may have been taken offline for scheduled maintenance and may be completely out of service during that maintenance window. In another example, a partial failure may have occurred causing some, but not all, communication associated with the server device 104 to be unavailable. In these examples, the computing device 108 may notice that something is amiss by, for example, failing to receive an expected message from the server device 104 within a threshold period of a scheduled time, by failing to receive an answer from the server device 104 after prompting (e.g., sending a request/message to) the server device 104, and/or by determining that a file has not been modified as expected.

Upon determining that the server device 104 is at least partially out of service, the computing device 108 may set a flag 112 to a value 114 (See Step 1 in FIG. 1) indicative of the server device 104 being at least partially out of service.

In the example of FIG. 1, the flag 112 is called "Service Condition" and the value 114 is specified as "Out of Service." These are merely examples, however, and the flag 112 and/or the value 114 can be specified in other ways, such as specifying the flag 112 as an "out-of-service flag", an "out-of-rotation flag", or the like. In some examples, the flag 112 may be configured to be set to a value of multiple possible values. In this example, the value 114 ("Out of Service") depicted in FIG. 1 may represent a first value of multiple possible values, and the flag 112 may be configured to be set to a second value (e.g., "In Service") to indicate that the server device 104 is in service. In some examples, setting a flag 112 to a "value" may include enabling, creating, and/or generating the flag 112 to indicate that the server device 104 is out of service (or in service), in which case, the flag 112 may be removed or cleared to provide an indication that the server device 104 is back in service (or out of service). In some examples, the binary values to which the flag 112 can be set include, without limitation, enabled/disabled, available/unavailable, in-rotation/out-of-rotation, in-service/out-of-service, true/false, yes/no, on/off, etc. In some examples, the flag 112 may represent a bit that can be set to a Boolean value of "true" or "false." For example, if the flag 112 is an "out-of-service flag", and if the flag 112 is set to a Boolean value of "true," this may be used to indicate that the server device 104 is at least partially out of service. In this example, a Boolean value of "false" may be used to indicate that the server device 104 is in service. In some examples, the flag 112 may represent a state variable that can be set to one of multiple values and/or toggled between those multiple values to indicate the service condition of the server device 104. There are many possible configurations for the flag 112 and the values to which the flag 112 can be set, and it is to be appreciated that "setting the flag 112 to a value", as used herein, may include any of the examples disclosed herein and equivalents thereof. Furthermore, the flag(s) 112 that is/are set by the computing device 108 may be stored in association with an identifier(s) of the server device 104 within a database that is accessible to the computing device 108. In this way, the value of the flag(s) 112 can be quickly referenced to determine a service condition of any given server device, including the server device 104, on demand.

At Step 2 (depicted in FIG. 1), the client device 102 may send a message 116 to the server device 104. The message 116 may be any suitable type of message. In the examples herein, the client device 102 and the server device 104 may be nodes of a core network of a telecommunication service provider (sometimes referred to herein as a "wireless carrier"), and the message 116 may represent a message transmitted to the server device 104 for setting up (or for tearing down) a communication session (e.g., a call) on behalf of a subscriber of the telecommunication service provider and/or on behalf of a user equipment (UE) of the subscriber. However, the message 116 is not limited to a session setup or teardown message, and it could be any suitable type of message. Unbeknownst to the client device 102, at the time of sending the message 116 to the server device 104, the server device 104 is at least partially out of service. For example, the server device 104 may receive the message 116, but may be unable to process the message 116 as it would normally process the message 116 if the server device 104 was in service. In other examples, the client device 102 may be unable to successfully deliver the message 116 to the server device 104. In some examples, the message 116 can be routed through the computing device 108 before it is sent to the server device 104. That is, the client device 102 may send the message 116 to the computing device 108, and the computing device 108 may forward the message 116 to the server device 104. In this scenario, the message 116 is still considered to be "destined for" the server device 104. In other examples, the computing device 108 may monitor the transmission of the message 116 as it is transmitted directly from the client device 102 to the server device 104, and/or the computing device 108 may expect to receive a confirmation message from the client device 102 confirming that the client device 102 transmitted the message 116, and/or a confirmation message from the server device 104 confirming that the server device 104 received the message 116. In any of these examples, the computing device 108 may be configured to determine that the client device 102 sent the message 116 to the server device 104.

At Step 3 (depicted in FIG. 1), in response to the computing device 108 determining that the client device 102 sent the message 116 to the server device 104, and based at least in part on the value 114 (e.g., "Out of Service") of the flag 112, the computing device 108 may send, to the client device 102, a notification 106 indicating that the server device 104 is at least partially out of service. The client device 102 may take appropriate action(s) in response to this notification 106, as described herein. For example, the client device 102, in response to receiving the notification 106, may suppress messages destined for the server device 104 until the client device 102 is notified that the server device 104 is back in service. In this manner, the client device 102 may treat the server device 104 as being out of service, at least temporarily, and during that downtime, the client device 102 may refrain from sending one or more messages to the server device 104, which reduces, if not eliminates, extraneous traffic in the network 110, thereby conserving network bandwidth. Although not shown in FIG. 1, it is to be appreciated that the flag 112 can be toggled between multiple values based on a determined service condition of the server device 104 (e.g., on/off, true/false, enabled/disabled, available/unavailable, etc.). In this way, if and when the computing device 108 determines that the server device 104 returns to service (e.g., by suddenly receiving a "keepalive" message transmission, and/or determining that a "keepalive" file has been modified by the server device 104, and/or receiving an answer in response to prompting the server device 104, etc.), the flag 112 can be set to a second value (e.g., "In Service") or removed/cleared to indicate that the server device 104 is back in service. If this occurs, and after setting or clearing the flag 112 accordingly, the computing device 108 may notify the client device 102 of the in-service condition of the server device 104 by sending a second notification to the client device 102. In response to such a second notification, the client device 102 may take appropriate action(s), such as by resuming sending one or more messages to the server device 104 (e.g., ending the suppression of messages that are destined for the server devices 104).

Figure 2:
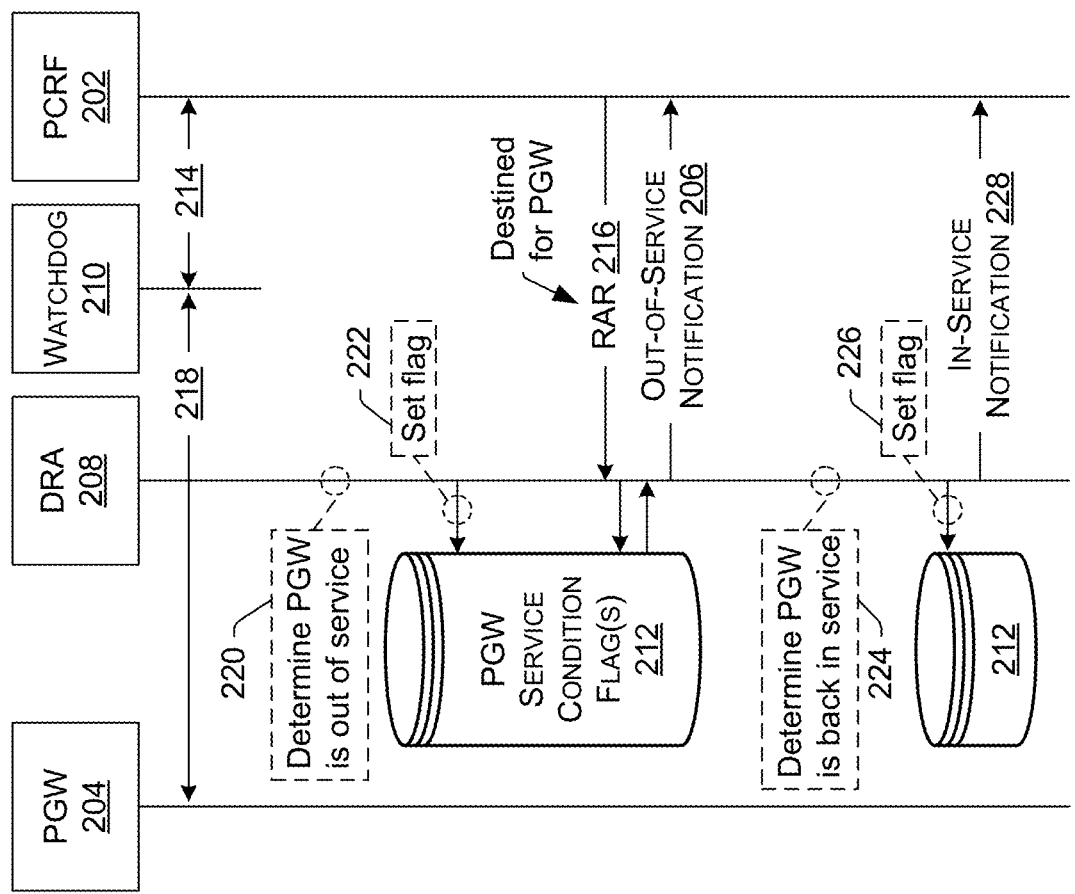
FIG. 2 is a diagram illustrating example signaling between example network nodes of a 4G LTE network, as well as a technique for providing, to a PCRF, service condition notifications regarding a PGW.

FIG. 2 is a diagram illustrating example signaling between example network nodes of a 4G LTE network, as well as a technique for providing, to a PCRF 202, service condition notifications regarding a PGW 204. It is to be appreciated that the "nodes" depicted in FIG. 2 may in fact represent multiple nodes or a single node. It is also to be appreciated that additional nodes may be utilized, and/or involved in, the signaling depicted in FIG. 2, such as during the setup of a communication session (e.g., a VoLTE call), even though they are not depicted in FIG. 2. For example, and without limitation, one or more P-CSCF nodes, serving CSCF (S-CSCF) nodes, application servers, a home subscriber server (HSS), and the like may be involved (e.g., in the setup of a communication session), as would be recognized by a person having ordinary skill in the art.

In addition to the PCRF 202 and the PGW 204, FIG. 2 illustrates a DRA 208 and a watchdog device 210. In this configuration, the PCRF 202 may be an example of a client device 102, the PGW 204 may be an example of a server device 104, and the DRA 208 and/or the watchdog device 210 may be an example of the computing device 108 introduced in FIG. 1. The watchdog device 210 may be configured to monitor the operability and/or connectivity of the PCRF 202 and/or the PGW 204 via signaling 214 and 218, respectively, and/or monitor the messages transmitted between the PCRF 202 and the PGW 204. For example, the watchdog device 210 may utilize "keepalive" functionality to periodically check on the service condition of at least the PGW 204, as described herein. In one example, the PGW 204 may be configured to periodically (e.g., every few seconds, minutes, etc.) send a message to the watchdog device 210 and/or modify a file accessible to the watchdog device 210 to let the watchdog device 210 know that the PGW 204 is in service. In another example, the watchdog device 210 may be configured to periodically (e.g., every few seconds, minutes, etc.) send a message to the PGW 204 to prompt a response from the PGW 204 (e.g., a polling technique, request-and-answer technique, etc.).

In some examples, the DRA 208 can be omitted, in which case the PCRF 202 may be directly connected to the PGW 204. In the example of FIG. 2, however, the DRA 208 is an intermediary device, and the PCRF 202 is indirectly connected to the PGW 204 via the DRA 208. The DRA 208 may be configured to route messages, such as Re-Authenticate-Requests (RARs) (e.g., Gx RARs), between the PCRF 202 and the PGW 204 using Diameter protocol, as defined by the Internet Engineering Task Force (IETF). The DRA 208 may be further configured to determine, based on routing such messages, and/or by utilizing the watchdog device 210, a service condition of at least the PGW 204. For example, the DRA 208 may be configured to determine whether the PGW 204 is in service or out of service (e.g., at least partially out of service). In the example of FIG. 2, the DRA 208 determines, at 220, that the PGW 204 is at least partially out of service. For example, the DRA 208 can make the determination at 220 by utilizing the watchdog 210 as a "keepalive" service (e.g., the watchdog 210 may notify the DRA 208 that a connection with the PGW 204 has gone down). In scenarios where the DRA 208 is not present, the watchdog device 210 may make the determination at 220, and/or the PCRF 202 may make the determination at 220. For instance, the PCRF 202 may transmit a message directly to the PGW 204 and may receive an error response from the PGW 204, or a timeout may occur without receiving a response from the PGW 204. Additionally, or alternatively, the PCRF 202 may utilize the watchdog device 210 to make the determination at 220. Notably, when the DRA 208 is present, the PCRF 202 may be incapable of determining whether the PGW 204 is out of service merely based on an error response that the PCRF 202 receives from the PGW 204 or based on a timeout without receiving a response from the PGW 204. Accordingly, the DRA 208 can make the determination at 220 in such a configuration (as depicted in FIG. 2). It is also to be appreciated that the PGW 204 may be partially or completely out of service. For example, a partial failure may have occurred causing some, but not all, communication associated with the PGW 204 to be unavailable, yet the PGW 204 may still be considered to be out of service according to the determination at 220. In an illustrative example, bearer side communication associated with the PGW 204 (e.g., communication of customer traffic) may be available, yet control plane communication associated with the PGW 204 may be unavailable, thus rendering the PGW 204 at least partially out of service.

Based on the determination at 220 that the PGW 204 is at least partially out of service, the DRA 208 (or, alternatively, the watchdog device 210, or the PCRF 202) may set a flag, such as the flag 112, at 222. At least in the example of FIG. 2, the flag 112 that is set at 222 may be referred to as a "Diameter protocol flag," or a "Diameter protocol out-of-service flag." In any case, the flag 112 may be set to a value 114 (e.g., a first value of multiple values) at 222, and this (first) value 114 (e.g., "Out of Service") may indicate that the PGW 204 is at least partially out of service. As described herein, setting the flag 112 at 222 can be implemented in various ways, such as setting a Boolean value or a state variable, enabling, creating, or generating the flag 112, etc. FIG. 2 illustrates a database storing one or more PGW service condition flags 212, which may include the flag 112 introduced in FIG. 1. Accordingly, the flag 112 set at 222 may be stored in the database of flags 212 in association with an identifier(s) (e.g., a host name) of the PGW 204, and the stored flag 112 may be set to the (first) value 114 within the database of flags 212. In this way, the database of flags 212 is accessible to the DRA 208 (or, alternatively, to the watchdog device 210, or the PCRF 202) so that the value(s) of the flag(s) 212 can be quickly referenced to determine a service condition of any give PGW, such as the PGW 204, on demand. In some examples, the database of flags 212 is accessible to the PCRF 202, and the DRA 208 may send a message to the PCRF 202 that causes the PCRF 202 to set the flag at 222.

FIG. 2 further illustrates, after setting the flag 112 at 222, that the PCRF 202 might send a Re-Authenticate-Request (RAR) 216 (e.g., Gx RAR 216) destined for the PGW 204. The RAR 216 is an example of the message 116 introduced in FIG. 1. The RAR 216 is a call setup message sent to the PGW 204 during setup of a communication session (e.g., a VoLTE call) on behalf of a subscriber of a wireless carrier and/or on behalf of the UE of the subscriber. The wireless carrier may operate the 4G LTE network. As depicted in FIG. 2, the DRA 208 receives the RAR 216, accesses the database of flags 212 to determine that the PGW 204 is out of service, and sends an out-of-service notification 206 to the PCRF 202 to inform the PCRF 202 that the PGW 204 is at least partially out of service. This receipt of the out-of-service notification 206 by the PCRF 202 allows the PCRF 202 to take appropriate action based at least in part on the out-of-service condition of the PGW 204. For example, as described in more detail herein, the PCRF 202 may suppress future messages destined for the PGW 204 until the PCRF 202 is notified that the PGW 204 has returned to service.

FIG. 2 illustrates that, subsequent to the sending of the out-of-service notification 206, the DRA 208 (or, alternatively, the watchdog device 210, or the PCRF 202) may determine, at 224, that the PGW 204 is back in service. This may be the case if a maintenance window associated with the PGW 204 has ended and the PGW 204 comes back online, or if an issue causing a complete or partial failure of the PGW 204 has been fixed, or the like. Based on the determination, at 224, that the PGW 204 is back in service, the DRA 208 (or, alternatively, the watchdog device 210, or the PCRF 202) may set the flag 112 at 226. This time, the flag 112 may be set to a second value at 226, and this second value (e.g., "In Service") may indicate that the PGW 204 is back in service. In some examples, setting the flag 112 at 226 may include removing or clearing the flag 112 in an implementation where the flag 112 is enabled, created, or generated at 222, and where removal or clearing of the flag 112 indicates that the PGW 204 is back in service. This could be implemented in the opposite direction as well (e.g., the flag 112 may be set to indicate the PGW 204 is in service, and removal or clearing of the flag 112 may indicate the out-of-service condition of the PGW 204). In response to the operation at 226, the DRA 208 can send an in-service notification 228 to the PCRF 202 to inform the PCRF 202 that the PGW 204 is back in service. The receipt of the in-service notification 228 by the PCRF 202 allows the PCRF 202 to return to normal operation with respect to the PGW 204, such as by resuming sending one or more messages destined for the PGW 204.

It is to be appreciated that, in some examples, the client device 102, such as the PCRF 202 in the example of FIG. 2, may be the initiator of notifying other devices (e.g., a P-CSCF node(s)) about the service condition (e.g., out of service or in service) of the server device 104, such as the PGW 204 in the example of FIG. 2. In some examples, the notification (e.g., an out-of-service notification 206 or an in-service notification 228), whether sent from the DRA 208, the watchdog device 210, or the PCRF 202, may trigger a cascade effect where the receiver of the notification forwards the notification to another (downstream or upstream) device, which forwards the notification to another (downstream or upstream) device, and so on and so forth for any number of devices. In this manner, a notification may propagate relatively quickly through a network of devices so that a plurality of devices are made aware of a change to the service condition of the server device 104.

Figure 3:
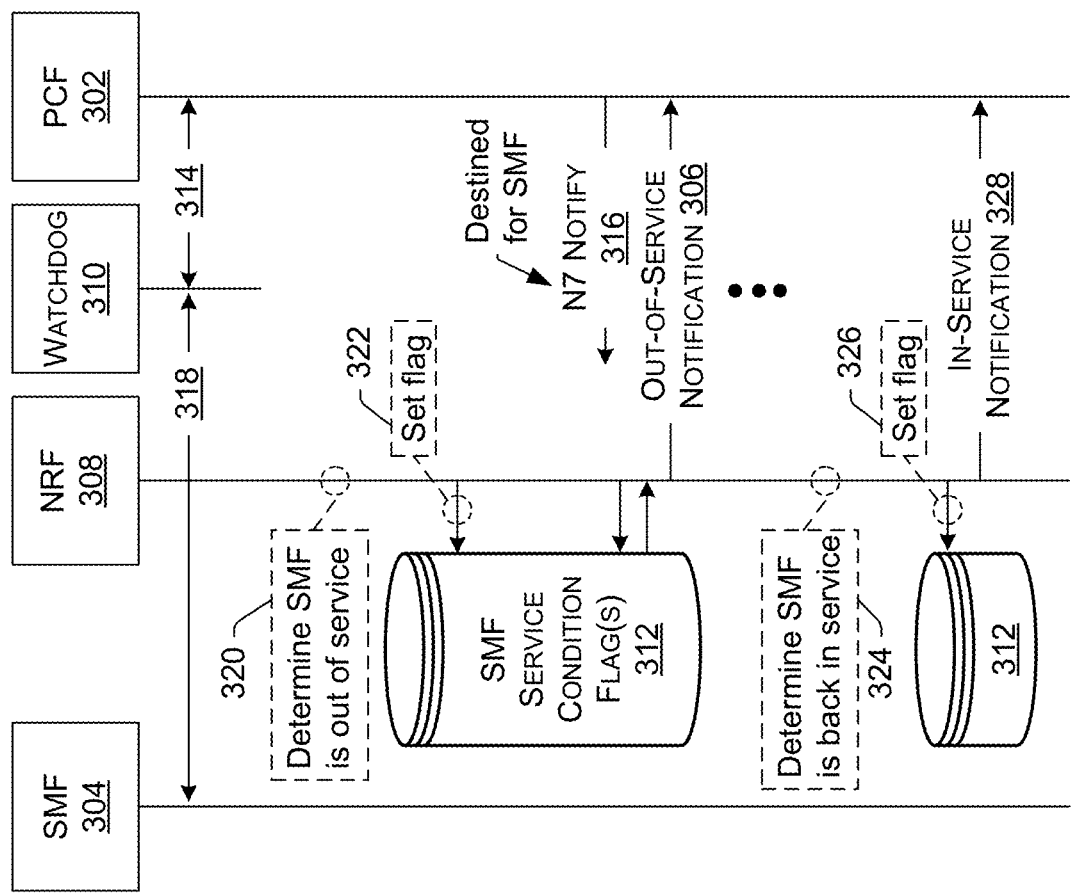
FIG. 3 is a diagram illustrating example signaling between example network nodes of a 5th Generation (5G) New Radio (NR) network, as well as a technique for providing, to a policy control function (PCF), service condition notifications regarding a session management function (SMF).

FIG. 3 is a diagram illustrating example signaling between example network nodes of a 5G NR network, as well as a technique for providing, to a PCF 302, service condition notifications regarding a SMF 304. It is to be appreciated that the "nodes" depicted in FIG. 3 may in fact represent multiple nodes or a single node. It is also to be appreciated that additional nodes may be utilized, and/or involved in, the signaling depicted in FIG. 3, such as during the setup of a communication session (e.g., a VoNR call) even though they are not depicted in FIG. 3, as would be recognized by a person having ordinary skill in the art.

In addition to the PCF 302 and the SMF 304, FIG. 3 illustrates a NRF 308 and a watchdog device 310. In this configuration, the PCF 302 may be an example of a client device 102, the SMF 304 may be an example of a server device 104, and the NRF 308 and/or the watchdog device 310 may be an example of the computing device 108 introduced in FIG. 1. The watchdog device 310 may be configured to monitor the operability and/or connectivity of the PCF 302 and/or the SMF 304 via signaling 314 and 318, respectively, and/or monitor the messages transmitted between the PCF 302 and the SMF 304. For example, the watchdog device 310 may utilize "keepalive" functionality to periodically check on the service condition of at least the SMF 304, as described herein.

In some examples, the NRF 308 can be omitted. In the example of FIG. 3, however, the NRF 308 communicates with the SMF 304 and the PCF 302 via a Hypertext Transfer Protocol (HTTP), such as HTTP/2. The NRF 308 may be configured to route messages, such as N7 interface messages, between the PCF 302 and the SMF 304. The NRF 308 may be further configured to determine, based on routing such messages, and/or by utilizing the watchdog device 310, a service condition of at least the SMF 304. For example, the NRF 308 may be configured to determine whether the SMF 304 is in service or out of service (e.g., at least partially out of service). In the example of FIG. 3, the NRF 308 determines, at 320, that the SMF 304 is at least partially out of service. In scenarios where the NRF 308 is not present, the watchdog device 310 may make the determination at 320, and/or the PCF 302 may make the determination at 320. For example, the PCF 302 may transmit a message to the SMF 304 and may make the determination at 320 based on an error response from the SMF 304 or a timeout occurring after transmitting the message to the SMF 304. The PCF 302 may additionally, or alternatively, utilize the watchdog device 310 to make the determination at 320. It is to be appreciated that the SMF 304 may be partially or completely out of service. For example, a partial failure may have occurred causing some, but not all, communication associated with the SMF 304 to be unavailable, yet the SMF 304 may still be considered to be out of service at 320. In an illustrative example, bearer side communication associated with the SMF 304 (e.g., communication of customer traffic) may be available, yet control plane communication associated with the SMF 304 may be unavailable, thus rendering the SMF 304 at least partially out of service.

Based on the determination at 320 that the SMF 304 is at least partially out of service, the NRF 308 (or, alternatively, the watchdog device 310, or the PCF 302) may set a flag, such as the flag 112, at 322. The flag 112 may be set to a (first) value 114 at 322, and this (first) value 114 (e.g., "Out of Service") may indicate that the SMF 304 is at least partially out of service. As described herein, setting the flag 112 at 322 can be implemented in various ways, such as setting a Boolean value or a state variable, enabling, creating, or generating the flag 112, etc. FIG. 3 illustrates a database storing one or more SMF service condition flags 312, which may include the flag 112 introduced in FIG. 1. Accordingly, the flag 112 that is set at 322 may be stored in the database of flags 312 in association with an identifier(s) (e.g., a host name) of the SMF 304, and the stored flag 112 may be set to the (first) value 114 within the database of flags 312. In this way, the database of flags 312 is accessible to the NRF 308 (or, alternatively, to the watchdog device 310, or the PCF 302) so that the value(s) of the flag(s) 312 can be quickly referenced to determine a service condition of any given SMF, such as the SMF 304, on demand. In some examples, the database of flags 312 is accessible to the PCF 302, and the NRF 308 may send a message to the PCF 302 causing the PCF 302 to set the flag at 322.

FIG. 3 further illustrates, after setting the flag 112 at 322, that the PCF 302 might send a N7 Notify message 316 destined for the SMF 304. The N7 Notify message 316 is an example of the message 116 introduced in FIG. 1. The N7 Notify message 316 is sent to the SMF 304 during setup of a communication session (e.g., a VoNR call) on behalf of a subscriber of a wireless carrier who operates the 5G NR network and/or on behalf of the UE of the subscriber. FIG. 3 depicts that, in response to the PCF 302 sending the N7 Notify message 316, the NRF 308 accesses the database of flags 312 to determine that the SMF 304 is out of service, and sends an out-of-service notification 306 to the PCF 302 to inform the PCF 302 that the SMF 304 is at least partially out of service. This receipt of the out-of-service notification 306 by the PCF 302 allows the PCF 302 to take appropriate action based at least in part on the out-of-service condition of the SMF 304. For example, as described in more detail herein, the PCF 302 may suppress future messages destined for the SMF 304 until the PCF 302 is notified that the SMF 304 has returned to service.

FIG. 3 illustrates that, subsequent to the sending of the out-of-service notification 306, the NRF 308 (or, alternatively, the watchdog device 310, or the PCF 302) may determine, at 324, that the SMF 304 is back in service. This may be the case if a maintenance window associated with the SMF 304 has ended and the SMF 304 comes back online, or if an issue causing a complete or partial failure of the SMF 304 has been fixed, or the like. Based on the determination, at 324, that the SMF 304 is back in service, the NRF 308 (or, alternatively, the watchdog device 310, or the PCF 302) may set the flag 112 at 326. This time, the flag 112 may be set to a second value at 326, and this second value (e.g., "In Service") may indicate that the SMF 304 is back in service. In some examples, setting the flag 112 at 326 may include removing or clearing the flag 112 in an implementation where the flag 112 is enabled, created, or generated at 322. In response to the operation at 326, the NRF 308 can send an in-service notification 328 to the PCF 302 to inform the PCF 302 that the SMF 304 is back in service. The receipt of the in-service notification 328 by the PCF 302 allows the PCF 302 to return to normal operation with respect to the SMF 304, such as by resuming sending one or more messages destined for the SMF 304.

Figure 4:
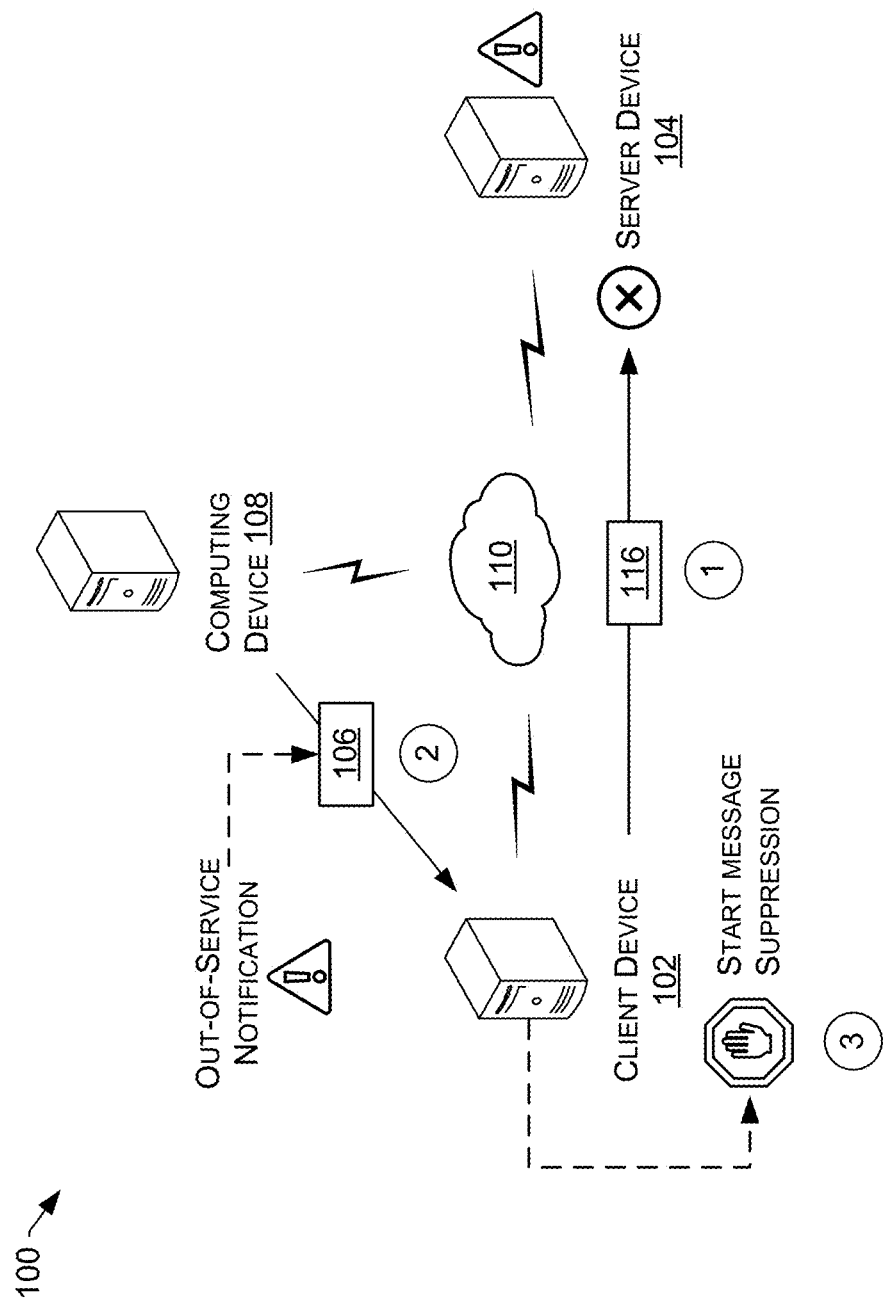
FIG. 4 illustrates the system of FIG. 1, and a technique for suppressing messages to the server device when the server device has gone out of service.

FIG. 4 illustrates the system 100 of FIG. 1, and a technique for suppressing messages to the server device 104 when the server device 104 has gone out of service. At Step 1 (depicted in FIG. 4), the client device 102 may send a message 116 to the server device 104. This may be similar to the transmission of the message 116 described with reference to FIG. 1, above. Unbeknownst to the client device 102, at the time of sending the message 116 to the server device 104, the server device 104 is at least partially out of service. For example, the server device 104 may receive the message 116, but may be unable to process the message 116 as it would normally process the message 116 if the server device 104 was in service. In other examples, the client device 102 may be unable to successfully deliver the message 116 to the server device 104. Furthermore, the computing device 108 may be configured to determine that the client device 102 sent the message 116 to the server device 104, as described herein.

At Step 2 (depicted in FIG. 4), in response to the client device 102 sending the message 116 to the server device 104, the client device 102 may receive, from the computing device 108, a notification 106 indicating that the server device 104 is at least partially out of service. Based at least in part on receiving the out-of-service notification 106, the client device 102 may, at Step 3 (depicted in FIG. 4), start suppressing messages destined for the server device 104, and the suppression of messages may last at least until the client device 102 is notified that the server device 104 is back in service. In this manner, the client device 102 may treat the server device 104 as being out of service, at least temporarily, and during that downtime, the client device 102 may refrain from sending one or more messages to the server device 104, which reduces, if not eliminates, extraneous traffic in the network, thereby conserving network bandwidth. Although not shown in FIG. 4, it is to be appreciated that the server device 104 may eventually return to service. If this occurs, the computing device 108, upon making this determination, may notify the client device 102 of the in-service condition of the server device 104 by sending a second notification to the client device 102, and the client device 102 may stop or cease suppressing messages destined for the server device 104, such as by resuming sending one or more messages to the server device 104.

Figure 5:
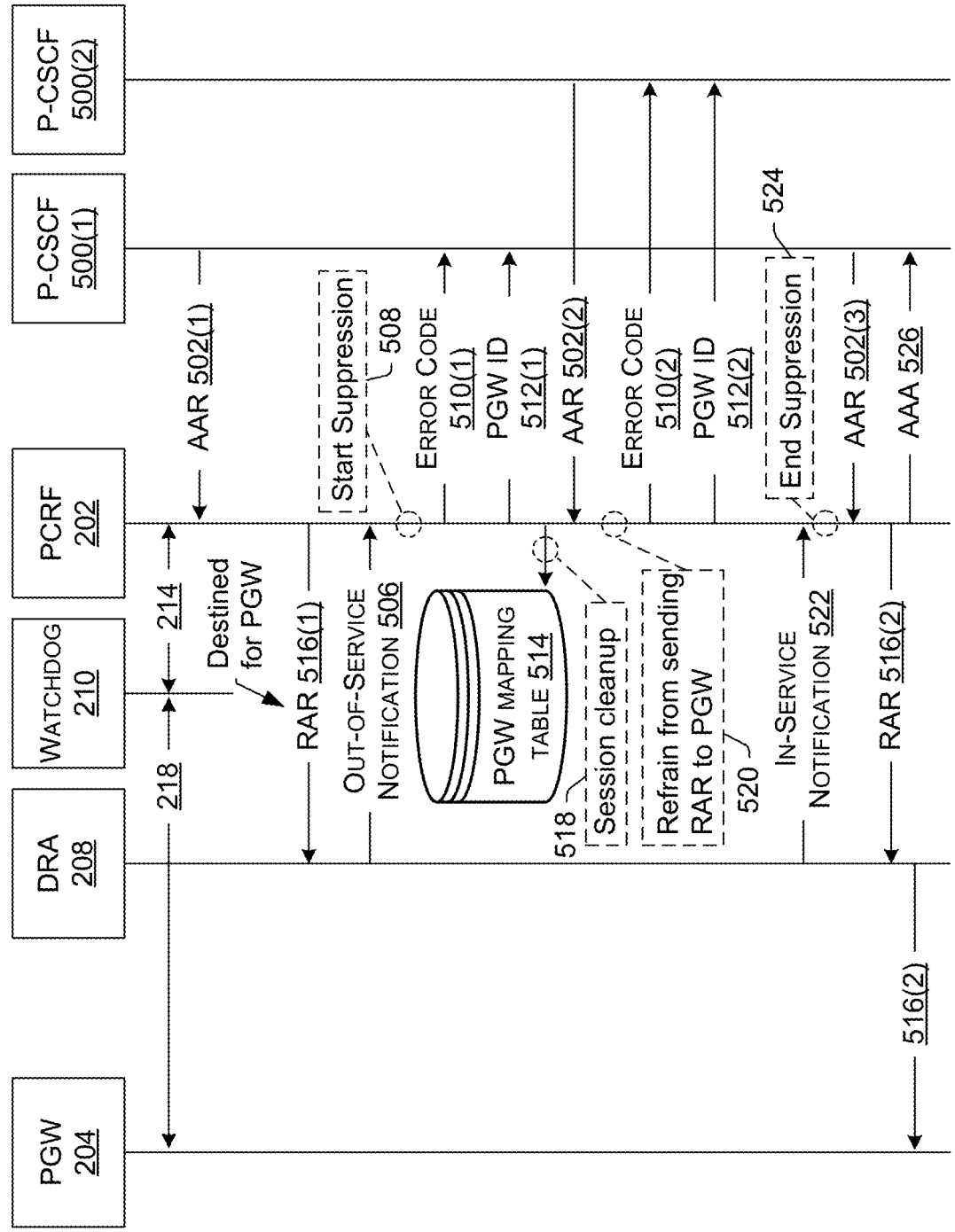
FIG. 5 is a diagram illustrating example signaling between example network nodes of a 4G LTE network, as well as a technique for suppressing messages to an out-of-service PGW.

FIG. 5 is a diagram illustrating example signaling between example network nodes of a 4G LTE network, as well as a technique for suppressing messages to an out-ofservice PGW 204. At least some of the network nodes (e.g., the PCRF 202, the PGW 204, the DRA 208, and the watchdog device 210) were introduced in FIG. 2. As with FIG. 2, it is to be appreciated that the "nodes" depicted in FIG. 5 may in fact represent multiple nodes or a single node. It is also to be appreciated that additional nodes may be utilized, and/or involved in, the signaling depicted in FIG. 5, such as during the setup of a communication session (e.g., a VoLTE call) even though they are not depicted in FIG. 5, as would be recognized by a person having ordinary skill in the art.

As with FIG. 2, the PCRF 202 may be an example of a client device 102, the PGW 204 may be an example of a server device 104, and the DRA 208 and/or the watchdog device 210 may be an example of the computing device 108. In some examples, the DRA 208 can be omitted, in which case the PCRF 202 may be directly connected to the PGW 204. In the example of FIG. 5, however, the DRA 208 is an intermediary device, and the PCRF 202 is indirectly connected to the PGW 204 via the DRA 208.

As illustrated in FIG. 5, a first P-CSCF node 500(1) may send an authorization authentication request (AAR) 502(1) (e.g., a Rx request message) to the PCRF 202. The AAR 502(1) may be a Rx message to create (or tear down) a voice call path. For example, the AAR 502(1) may be sent in response to the P-CSCF node 500(1) receiving a Session Initiation Protocol (SIP) INVITE that originated from a UE of a subscriber of a wireless carrier. SIP is a signaling protocol that can be used to establish, modify, and terminate multimedia sessions (e.g., a multimedia telephony call, an emergency call, etc.) over packet networks, and to authenticate access to IMS-based services. To initiate a VoLTE call, a UE (acting as a mobile originating (MO) UE) may send a SIP request using the SIP INVITE method to the IMS core, and in particular, to a P-CSCF node, such as the P-CSCF node 500(1). The P-CSCF node 500(1) acts as the ingress and egress point to and from the IMS core with respect to the UE. The responsibilities of the P-CSCF node 500(1) may include, without limitation, onward routing of registration and session requests to the correct nodes in the network, ensuring a S-CSCF node is kept updated on the radio access network (RAN) the UE is using, providing session information to the PCRF 202, and maintaining a secure connection with the UE. The P-CSCF node 500(1) may extract information from the SIP INVITE, such as quality of service (QoS) information, based on an interaction with a telephony application server (TAS) (not shown in FIG. 5), and may include the extracted information in the AAR 502(1) that is sent to the PCRF 202. Accordingly, the AAR 502(1) may include a media component description containing information such as the Max-Requested-Bandwidth-UL (uplink), the Max-Requested-Bandwidth-DL (downlink), and other information describing the traffic flows being requested. For instance, a VoLTE call may request a Real-time Transport Protocol (RTP) flow or a RTP Control Protocol (RTCP) flow. RTP is a standardized packet format for delivering audio and video over IP networks. RTCP may be used to monitor transmission statistics and QoS, and may aid in the synchronization of multiple streams.

In general, the PCRF 202 creates and installs a set of charging and QoS rules for the media information received in the AAR 502(1). In response to receiving the AAR 502(1), the PCRF 202 may send a RAR 516(1) destined for the PGW 204, which is to be used for setting up (or tearing down) a communication session (e.g., a VoLTE call) for a subscriber of a wireless carrier and/or for the UE of the subscriber. For example, the RAR 516(1) may be usable for installing the charging rules created by the PCRF 202, such as guaranteed bit rate (GBR) bandwidth reserved for the VoLTE call (e.g., in bits per second (bps)) for the RTP stream (both UL and DL directions), as well as a QoS Class Indicator (QCI) value.

As noted above, however, in some situations, the PGW 204 may be at least partially out of service and unable to receive and/or process the RAR 516(1). The DRA 208, having received the RAR 516(1) from the PCRF 202 as an intermediary device, may be configured to send a notification 506 to the PCRF 202 indicating that the PGW 204 is at least partially out of service. This may be based at least in part on a flag 112 (accessible to the DRA 208) that is set to a value 114 indicating the out-of-service condition of the PGW 204, as described herein. The PCRF 202 receives the out-of-service notification 506 from the DRA 208, and, based at least in part on receiving the notification 506, starts suppressing messages destined for the PGW 204 at 508. In some examples, such as where the DRA 208 is omitted, the watchdog device 210 may send the out-of-service notification 506 to the PCRF 202. In other examples, the PCRF 202 may determine the out-of-service condition of the PGW 204 itself (e.g., based on an error returned from the PGW 204 or based on a timeout in a scenario where the PCRF 202 is directly connected to the PGW 204 without a DRA 208 interposed between the PCRF 202 and the PGW 204).

In general, the PCRF 202 is configured to answer the AAR 502(1), such as by transmitting an authorization authentication answer (AAA) (e.g., a Rx answer message) to the P-CSCF node 500(1). In this case, based on receiving the out-of-service notification 506 indicating that the PGW 204 is at least partially out of service, the PCRF 202 may send an error code 510(1) to the P-CSCF 500(1), the error code 510(1) indicative of the PGW 204 being at least partially out of service. In some examples, the error code 510(1) may indicate to the IMS core (or to a similar system maintained and/or operated by one or more service providers, such as one or more wireless carriers, that provide services to subscribers) that the reason why the communication session (VoLTE call) was not established is because of the loss of communication with the PGW 204. The error code 510(1) may, in some embodiments, instruct the P-CSCF node 500(1) and/or downstream nodes of the IMS core, to teardown the communication session(s) and cause the UE(s) associated with the session(s) to reestablish the session(s) on an in-service PGW. In some examples, the error code 510(1) is a uniquely-identifiable error code. In some examples, the error code 510(1) is a Diameter result code, such as a 5xxx-Permanent Failure code, or a 4xxx-Transient Failure code. Furthermore, the error code 510(1) may be sent as part of an AAA (e.g., a Rx answer message) to the P-CSCF node 500(1), which is responsive to the previously-received AAR 502(1) from the P-CSCF node 500(1). In some examples, the PCRF 202 may send, to the P-CSCF node 500(1), an identifier 512(1) (e.g., a host name) of the PGW 204 that is out of service. In this manner, the P-CSCF node 500(1) not only knows that a PGW is out-of-service, but knows which PGW (e.g., the PGW 204) is out-of-service. The identifier 512(1) may also be sent as part of an AAA (e.g., a Rx answer message) to the P-CSCF node 500(1).

FIG. 5 further illustrates a PGW mapping table 514 accessible to the PCRF 202. The PGW mapping table 514 may be database (e.g., a lookup table) that associates UE identifiers (e.g., IP addresses) and/or session identifiers with assigned PGWs for one or multiple sessions, including the session associated with the AAR 502(1). This PGW mapping table 514 may be stored locally at the PCRF 202 (e.g., in local memory of the PCRF 202), and/or at a remote storage location that is remote from (e.g., external to, geographically remote from, etc.) the PCRF 202. The PGW mapping table 514 is a tool that the PCRF 202 can use to determine where a session associated with the UE and/or a subscriber resides, and, specifically, on which PGW the session resides. FIG. 5 illustrates that the PCRF 202 may perform session cleanup at 518 with respect to the PGW mapping table 514. The session cleanup performed at 518 may involve deleting, from the PGW mapping table 514, one or more entries that indicate associations between session identifiers and/or UE identifiers and the PGW 204 that is out-of-service. For example, the PCRF 202 may use the identifier of the PGW 204 to look up, in the PGW mapping table 514, which sessions are associated with the out-of-service PGW 204, and may delete the entries for those "stale" sessions.

If and when the PCRF 202 receives another AAR 502(2) (e.g., from a second P-CSCF node 500(2)) after starting the suppression at 508, the PCRF 202 may refrain from sending a RAR to the out-of-service PGW 204 at 520. In other words, the PCRF 202 may suppress the RAR, which may mean that the RAR is not generated in the first place, or it may mean that the RAR is held in a buffer, deleted, or the like. In any case, the PCRF 202 does not send a message to the out-of-service PGW 204 to avoid creating extraneous network traffic. In some examples, the PCRF 202 may send, to the P-CSCF node 500(2), an error code 510(2), which may be the same error code as the error code 510(1), and/or an identifier 512(2) (e.g., host name) of the out-of-service PGW 204, which may be the same identifier as the identifier 512(1). The error code 510(2) and/or the identifier 512(2) may be sent as part of an AAA (e.g., a Rx answer message) to the P-CSCF node 500(2), which is responsive to the AAR 502(2) received from the P-CSCF node 500(2).

At some point in time, the PCRF 202 may receive a second notification 522 (e.g., from the DRA 208, or, alternatively, from the watchdog device 210) indicating that the PGW 204 is back in service. In response to receiving this in-service notification 522, the PCRF 202 may end (or terminate) the suppression of messages destined for the PGW 204 at 524. In other words, the PCRF 202 may resume sending one or more additional messages to the PGW 204 after receiving the second notification 522.

FIG. 5 illustrates that, after ending the suppression of messages destined for the PGW 204 at 524, the PCRF 202 may receive yet another AAR 502(3) from a P-CSCF node, such as the P-CSCF node 500(1), and may send a RAR 516(2) destined for the PGW 204, which is received by the DRA 208 and forwarded to the PGW 204 in the example of FIG. 5. The PCRF 202 may also send a AAA 526 to the P-CSCF node 500(1), which is responsive to the AAR 502(3).

Figure 6:
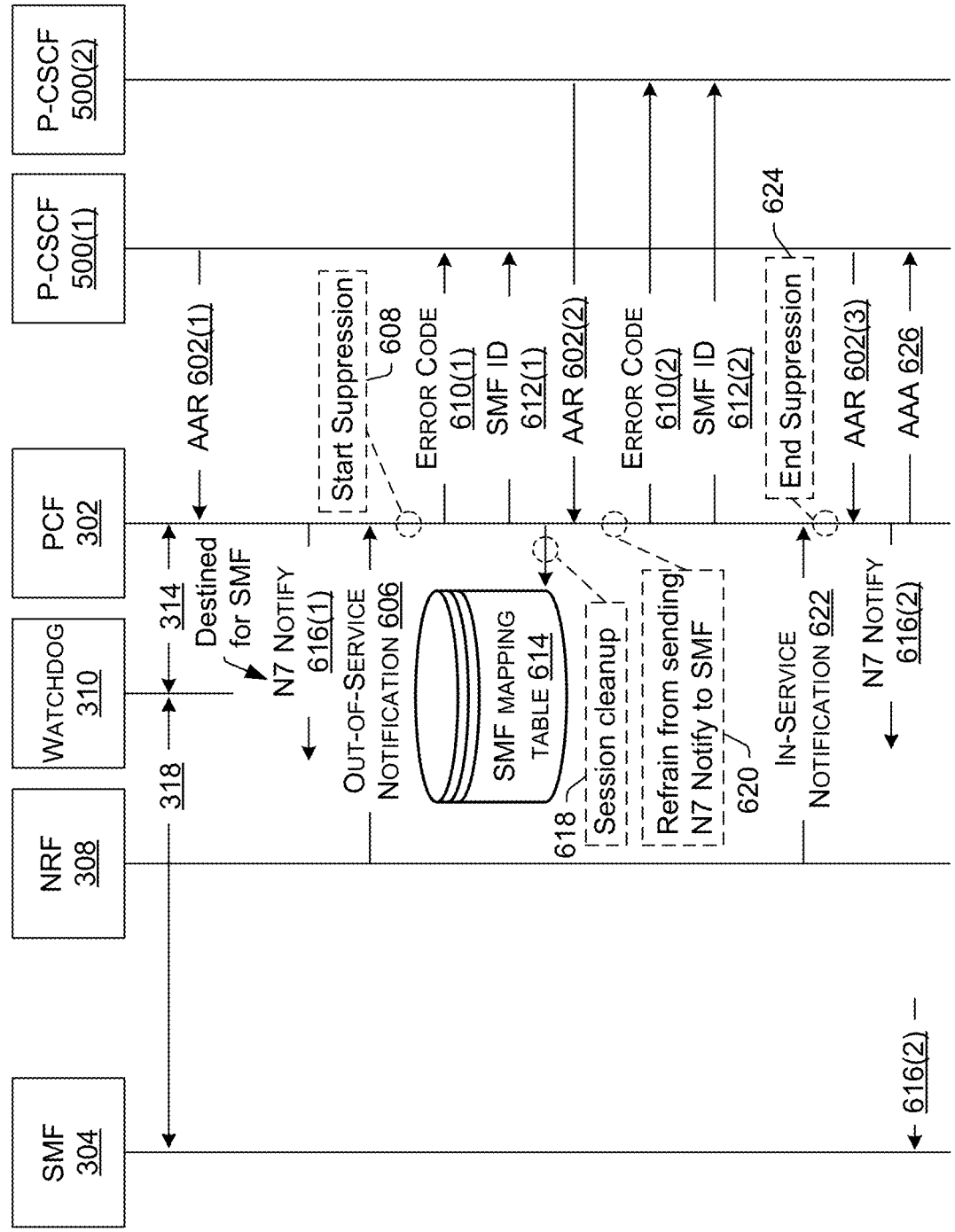
FIG. 6 is a diagram illustrating example signaling between example network nodes of a 5G NR network, as well as a technique for suppressing messages to an out-of-service SMF.

FIG. 6 is a diagram illustrating example signaling between example network nodes of a 5G NR network, as well as a technique for suppressing messages to an out-of-service SMF 304. At least some of the network nodes (e.g., the PCF 302, the SMF 304, the NRF 308, and the watchdog device 310) were introduced in FIG. 3. As with FIG. 3, it is to be appreciated that the "nodes" depicted in FIG. 6 may in fact represent multiple nodes or a single node. It is also to be appreciated that additional nodes may be utilized, and/or involved in, the signaling depicted in FIG. 6, such as during the setup of a communication session (e.g., a VoNR call) even though they are not depicted in FIG. 6, as would be recognized by a person having ordinary skill in the art.

As with FIG. 3, the PCF 302 may be an example of a client device 102, the SMF 304 may be an example of a server device 104, and the NRF 308 and/or the watchdog device 310 may be an example of the computing device 108. In some examples, the NRF 308 can be omitted. In the example of FIG. 6, however, the NRF 308 is present.

As illustrated in FIG. 6, a first P-CSCF node 500(1) may send an AAR 602(1) (e.g., a session setup request message) to the PCF 302. The AAR 602(1) may be sent in response to the P-CSCF node 500(1) receiving a SIP INVITE that originated from a UE of a subscriber of a wireless carrier. The P-CSCF node 500(1) may extract information, such as QoS information, and may include the extracted information in the AAR 602(1) that is sent to the PCF 302. In response to receiving the AAR 602(1), the PCF 302 may send a N7 Notify message 616(1) destined for the SMF 304, which is to be used for setting up a communication session (e.g., a VoNR call) for a subscriber of a wireless carrier and/or for the UE of the subscriber.

As noted above, however, in some situations, the SMF 304 may be at least partially out of service and unable to receive and/or process the N7 Notify message 616(1). The NRF 308, having monitored the transmission of the N7 Notify message 616(1), may be configured to send a notification 606 to the PCF 302 indicating that the SMF 304 is at least partially out of service. This may be based at least in part on a flag 112 (accessible to the NRF 308) that is set to a value 114 indicating the out-of-service condition of the SMF 304, as described herein. The PCF 302 receives the out-of-service notification 606 from the NRF 308, and, based at least in part on receiving the notification 606, starts suppressing messages destined for the SMF 304 at 608. In some examples, such as where the NRF 308 is omitted, the watchdog device 310 may send the out-of-service notification 606 to the PCF 302. In other examples, the PCF 302 may determine the out-of-service condition of the SMF 304 itself (e.g., based on an error returned from the SMF 304, a timeout, etc.).

In general, the PCF 302 is configured to answer the AAR 602(1), such as by transmitting an AAA (e.g., an answer message) to the P-CSCF node 500(1). In this case, based on receiving the out-of-service notification 606 indicating that the SMF 304 is at least partially out of service, the PCF 302 may send an error code 610(1) indicative of the SMF 304 being at least partially out of service. In some examples, the error code 610(1) may indicate to the IMS core (or to a similar system) that the reason why the communication session (VoNR call) was not established is because of the loss of communication with the SMF 304. The error code 610(1) may, in some embodiments, instruct the P-CSCF node 500(1) and/or downstream nodes of the IMS core, to tear-down the communication session(s) and cause the UE(s) associated with the session(s) to reestablish the session(s) on an in-service SMF 304. Furthermore, the error code 610(1) may be sent as part of an AAA (e.g., an answer message) to the P-CSCF node 500(1), which is responsive to the AAR 602(1) received from the P-CSCF node 500(1). In some examples, the PCF 302 may send, to the P-CSCF node 500(1), an identifier 612(1) (e.g., a host name) of the SMF 304. In this manner, the P-CSCF node 500(1) not only knows that a SMF is out-of-service, but knows which SMF (e.g., the SMF 304) is out-of-service. The identifier 612(1) may also be sent as part of an AAA (e.g., an answer message) to the P-CSCF node 500(1).

FIG. 6 further illustrates a SMF mapping table 614 accessible to the PCF 302. The SMF mapping table 614 may be database (e.g., a lookup table) that associates UE identifiers (e.g., IP addresses) and/or session identifiers with assigned SMFs for one or multiple sessions, including the session associated with the AAR 602(1). This SMF mapping table 614 may be stored locally at the PCF 302 (e.g., in local memory of the PCF 302), and/or at a remote storage location that is remote from (e.g., external to, geographically remote from, etc.) the PCF 302. The SMF mapping table 614 is a tool that the PCF 302 can use to determine where a session associated with the UE and/or a subscriber resides, and, specifically, on which SMF the session resides. FIG. 6 illustrates that the PCF 302 may perform session cleanup at 618 with respect to the SMF mapping table 614. The session cleanup performed at 618 may involve deleting, from the SMF mapping table 614, one or more entries that indicate associations between session identifiers and/or UE identifiers and the SMF 304 that is out-of-service. For example, the PCF 302 may use the identifier of the SMF 304 to look up, in the SMF mapping table 614, which sessions are associated with the out-of-service SMF 304, and may delete the entries for those "stale" sessions.

If and when the PCF 302 receives another AAR 602(2) (e.g., from a second P-CSCF node 500(2)) after starting the suppression at 608, the PCF 302 may refrain from sending a N7 Notify message to the out-of-service SMF 304 at 620. In other words, the PCF 302 may suppress the N7 Notify message, which may mean that the N7 Notify message is not generated in the first place, or it may mean that the N7 Notify message is held in a buffer, deleted, or the like. In any case, the PCF 302 does not send a message to the out-of-service SMF 304 to avoid creating extraneous network traffic. In some examples, the PCF 302 may send, to the P-CSCF node 500(2), an error code 610(2), which may be the same error code as the error code 610(1), and/or an identifier 612(2) (e.g., host name) of the out-of-service SMF 304, which may be the same identifier as the identifier 612(1). The error code 610(2) and/or the identifier 612(2) may be sent as part of an AAA (e.g., an answer message) to the P-CSCF node 500(2), which is responsive to the AAR 602(2) received from the P-CSCF node 500(2).

At some point in time, the PCF 302 may receive a second notification 622 (e.g., from the NRF 308, or, alternatively, from the watchdog device 310) indicating that the SMF 304 is back in service. In response to receiving this in-service notification 622, the PCF 302 may end (or terminate) the suppression of messages destined for the SMF 304 at 624. In other words, the PCF 302 may resume sending one or more additional messages to the SMF 304 after receiving the second notification 622.

FIG. 6 illustrates that, after ending the suppression of messages destined for the SMF 304 at 624, the PCF 302 may receive yet another AAR 602(3) from a P-CSCF node, such as the P-CSCF node 500(1), and may send a N7 Notify message 616(2) destined for the SMF 304, which is received by the SMF 304 in the example of FIG. 6. The PCF 302 may also send a AAA 626 to the P-CSCF node 500(1) responsive to the AAR 602(3).

The processes described in this disclosure may be implemented by the architectures described herein, or by other architectures. These processes are illustrated as a collection of blocks in a logical flow graph. Some of the blocks represent operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes. It is understood that the following processes may be implemented on other architectures as well.

Figure 7:
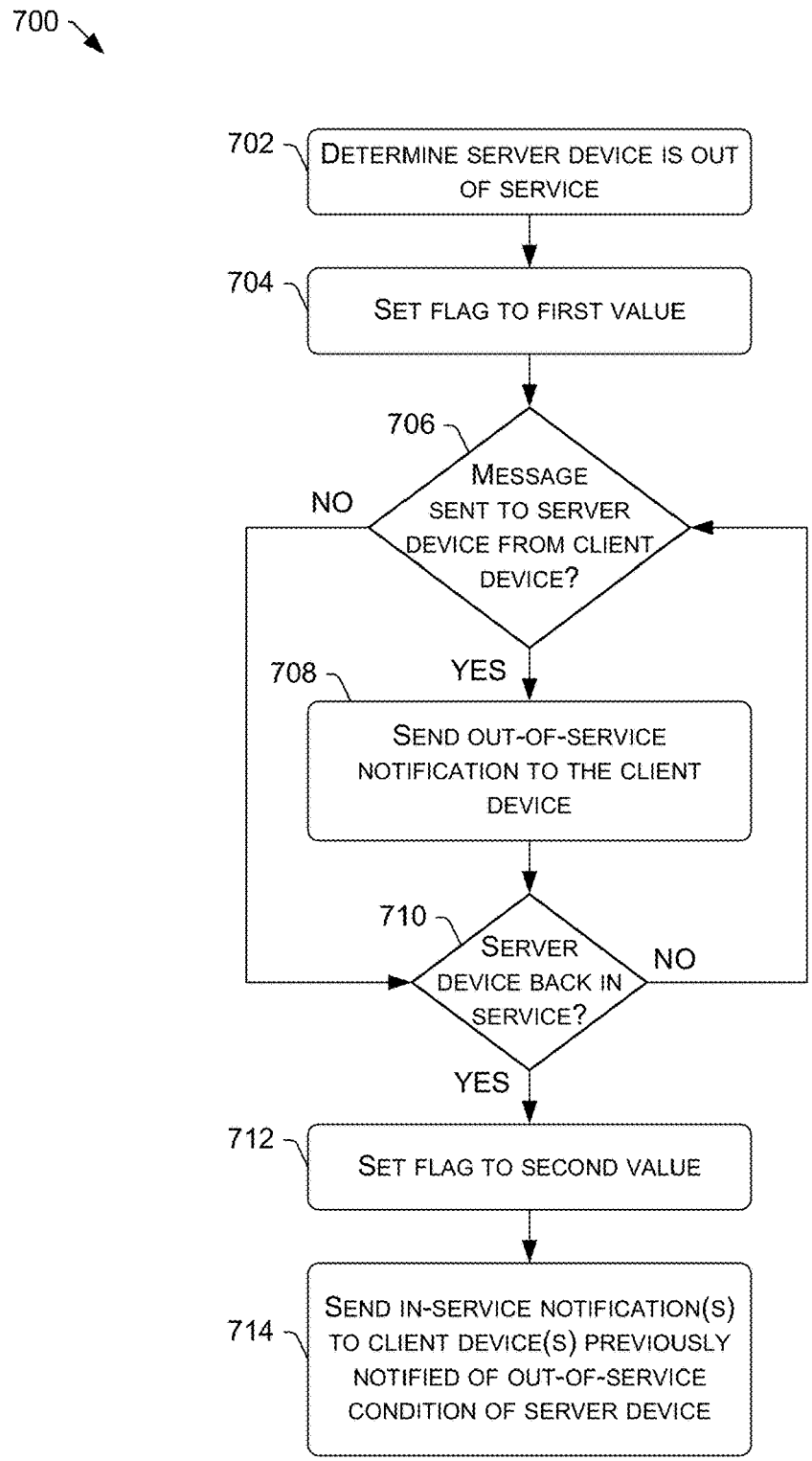
FIG. 7 illustrates a flowchart of an example process for providing service condition notifications regarding a server device, according to various embodiments.

FIG. 7 illustrates a flowchart of an example process 700 for providing service condition notifications regarding a server device 104, according to various embodiments. The process 700 is described with reference to the previous figures. The process 700 may be performed by a computing device(s) 108, such as a DRA 208, a NRF 308, and/or a watchdog device 210, 310, or any other suitable computing device(s) 108, such as a computing device that routes messages transmitted between, and/or monitors the operability and/or connectivity of, the client device 102 and the server device 104. Additionally, or alternatively, at least part of the process 700 may be performed by the client device 102.

At 702, a computing device(s) may determine that a server device 104 is at least partially out of service. The server device 104 may be a first node of a core network of a telecommunication service provider. For example, the server device 104 may be a PGW 204, a SMF 304, or any other suitable device, such as a gateway device, an access and mobility management function (AMF), an IoT server, or the like. The determining at block 702 may be performed using "keepalive" functionality, such as by utilizing a watchdog device 210, 310, as described herein. In other examples, the determining at block 702 may be performed based on routing messages between the server device 104 and a client device 102. For example, the computing device(s) making the determination at block 702 may expect to receive a response/answer from the server device 104 in response to transmitting (e.g., forwarding) a message to the server device 104, and if an error message is received from the server device 104, and/or if a timeout occurs without receiving a response/answer from the server device 104, the determination may be made at block 702.

At 704, the computing device(s) may set a flag 112 to a value 114 (e.g., a first value of multiple values) indicative of the server device 104 being at least partially out of service (e.g., unavailable).

At 706, the computing device(s) may determine whether a client device 102 sent a message 116 to the server device 104. The client device 102 may be a second node of the core network. For example, the client device 102 may be a PCRF 202, a PCF 302, a SMF 304 (e.g., if the server is an AMF), or any other suitable device. In some examples, the client device 102 is an IoT client, an end user device, or the like. If the computing device(s) determines, at block 706, that the client device 102 sent the message 116 (e.g., a message, such as RAR 216, N7 Notify message 316, etc., to setup a communication session for a subscriber of a wireless carrier and/or a UE of the subscriber), the process 700 may follow the YES route from block 706 to block 708.

At 708, the computing device(s) may send, to the client device 102, in response to the determining that the client device 102 sent the message 116 to the server device 104, and based at least in part on the (first) value 114 of the flag 112, a notification 106 indicating that the server device 104 is at least partially out of service. In some examples, the receipt of the notification 106 by the client device 102 may cause the client device 102 to refrain from sending one or more messages to the server device 104 until the client device 102 is notified that the server device 104 is back in service. In other words, the client device 102 may start suppressing messages to the server device 104 in response to receiving the out-of-service notification 106 sent at block 708.

At 710, after sending the out-of-service notification 106 at block 708, or after determining that a message has not been sent to the server device 104 (and following the NO route from block 706), the computing device(s) may determine whether the server device 104 is back in service (e.g., available). If the server device 104 is not back in service, the process 700 may follow the NO route from block 710 to continue monitoring message transmissions to the out-of-service server device 104 at block 706. Once it is determined that the server device 104 is back in service, the process 700 may follow the YES route from block 710 to block 712.

At 712, the computing device(s) may set the flag 112 to a second value indicative of the server device 104 being back in service. It is to be appreciated that setting the flag 112 to the second value may include removing or clearing the flag that was set (e.g., created, generated, enabled, etc.) at block 704.

At 714, the computing device(s) may send, to the client device 102, in response to setting the flag at block 712, and based at least in part on the second value of the flag 112, a second notification (e.g., the in-service notification 228, 328, 522, 622) indicating that the server device 104 is back in service. In some examples, the receipt of the in-service notification by the client device 102 may cause the client device 102 to resume sending one or more messages to the server device 104. In other words, the client device 102 may end (or terminate) the suppression of messages to the server device 104.

Figure 8:
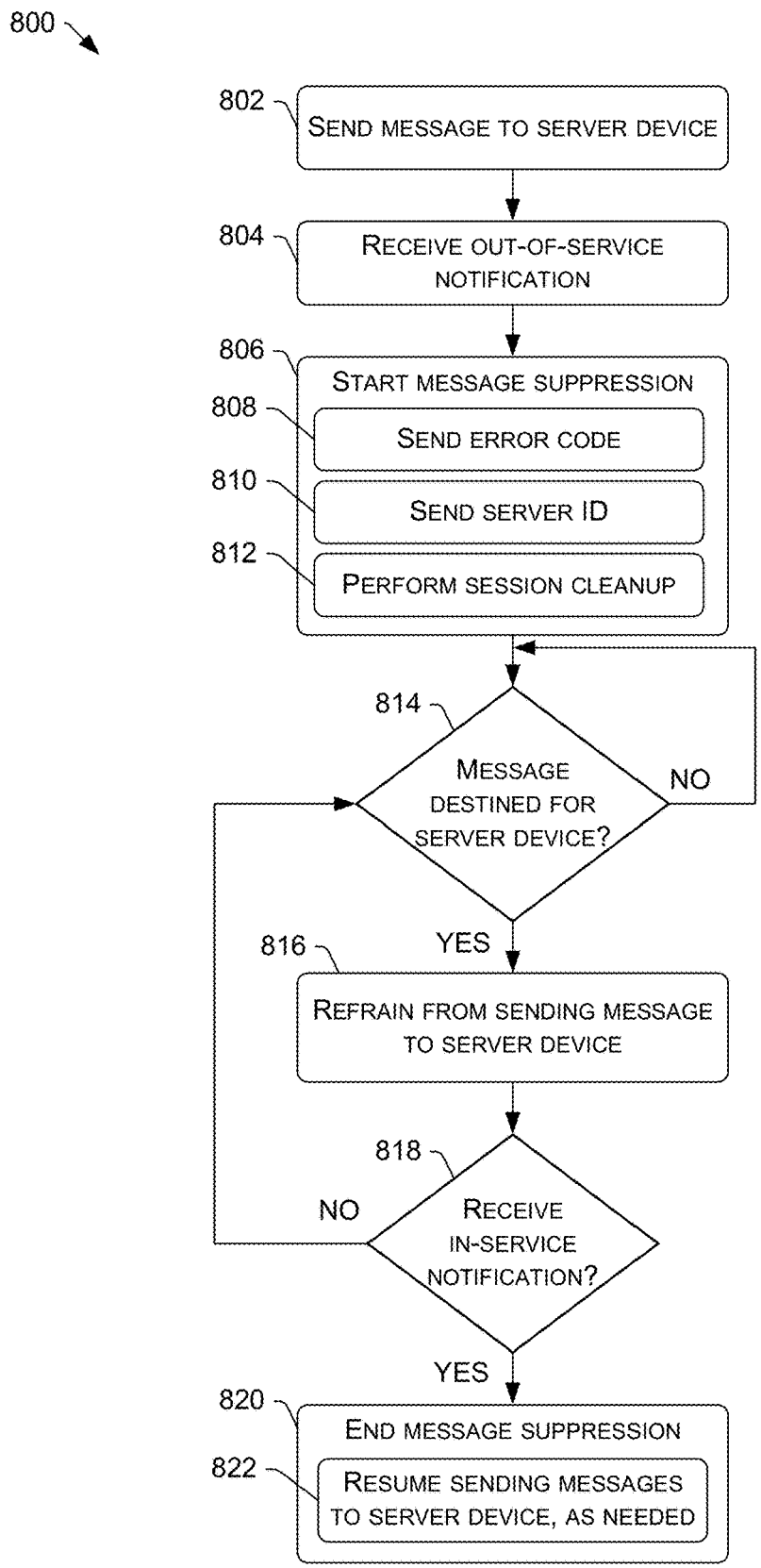
FIG. 8 illustrates a flowchart of an example process for starting and stopping suppression of messages destined for a server device, according to various embodiments.

FIG. 8 illustrates a flowchart of an example process 800 for starting and stopping suppression of messages destined for a server device 104, according to various embodiments. The process 800 is described with reference to the previous figures. The process 800 may be performed by a client device 102, in some examples.

At 802, a client device 102 may send a message 116 to a server device 104. The message 116 (e.g., a RAR 516(1), N7 Notify message 616(1), etc.) may be sent to the server device 104 by the client device 102 to setup a communication session for a subscriber of a wireless carrier and/or a UE of the subscriber. The client device 102 may be a first node of a core network of a telecommunication service provider. For example, the client device 102 may be a PCRF 202, a PCF 302, a SMF 304 (e.g., if the server 104 is an AMF), or any other suitable device. In some examples, the client device 102 is an IoT client, an end user device, or the like. The server device 104 may be a second node of the core network. For example, the server device 104 may be a PGW 204, a SMF 304, or any other suitable device, such as a gateway device, an AMF, an IoT server, or the like. Furthermore, the client device 102 may be indirectly connected to the server device 104 via an intermediary device (e.g., via the computing device 108, such as a DRA 208, NRF 308, etc.).

At 804, the client device 102 may receive, in response to the sending of the message 116 to the server device 104, a notification 106 indicating that the server device 104 is at least partially out of service (e.g., unavailable). In some examples, the notification 106 may be received at block 804 from at least one of a DRA 208, a watchdog device 210, 310, or a NRF 308.

At 806, based at least in part on the receiving of the notification 106 at block 804, the client device 102 may start suppressing messages with respect to the out-of-service server device 104. That is, the client device 102 may start suppressing one or more messages destined for the server device 104, at least until the client device 102 is notified that the server device 104 is back in service.

At sub-block 808, the client device 102 may send, to a P-CSCF node 500, an error code 510, 610 indicative of the server device 104 being at least partially out of service. In some examples, the client device 102 may send the error code 510, 610 in response to receiving the session setup message (e.g., the AAR 502, 602) from the P-CSCF node 500. In some examples, the error code 510, 610 is sent as part of an answer message (e.g., a Rx answer) to the session setup request sent by the P-CSCF node 500.

At sub-block 810, the client device 102 may send, to the P-CSCF node 500, an identifier (e.g., a host name) of the server device 104. The identifier of the server device 104 may be sent as part of an answer message (e.g., a Rx answer) to the session setup request sent by the P-CSCF node 500.

At sub-block 812, the client device 102 may delete, from a database that is accessible to the client device 102, one or more entries that indicate associations between session identifiers and the server device 104. For example, the client device 102 may perform session cleanup operations within a PGW mapping table 514 or a SMF mapping table 614 to delete "stale" sessions that are still assigned to the out-of-service server device 104.

At 814, the client device 102 may determine whether a message is destined for (e.g., is to be sent to) the out-of-service server device 104. For example, the client device 102 may receive a message, such as an AAR 502/602, from a different (e.g., upstream) device, such as a different P-CSCF node 500, which would have caused the client device 102 to send a message to the server device 104 under normal conditions (i.e., when the server device 104 was in service). If there is no message destined for (e.g., to be sent) to the out-of-service server device 104, the process 800 follows the NO route from block 814 to iterate the decision at block 814 until the client device 102 determines that a message is destined for (e.g., is to be sent to) the server device 104. For example, the client device 102 may receive, from a P-CSCF node 500, a message, such as a AAR 502(2), 602(2), to setup a communication session for a subscriber of a wireless carrier and/or a UE of the subscriber. The receipt of such a message may result in an affirmative determination at block 814, and the process 800 may follow the YES route from block 814 to block 816.

At 816, the client device 102 may refrain from sending the message (e.g., a RAR, N7 Notify message, etc.) to the server device 104 based on the message suppression that was started at block 806. As mentioned, refraining from sending the message may mean that the message is not generated in the first place, or it may mean holding the message in a buffer, deleting the message, or the like.

At 818, the client device 102 may determine whether it has received a second notification indicating that the server device 104 is back in service. If not, the process 800 may follow the NO route from block 818 back to block 814, where the client device 102 may determine if another message is to be sent to the server device 104, and blocks 814-818 may iterate until the client device 102 receives an in-service notification indicating that the server device 104 is back in service, which causes the process 800 to follow the YES route from block 818 to block 820.

At 820, in response to receiving the second, in-service notification at block 818, the client device 102 may end the message suppression with respect to the server device 104, which has now returned to service. For example, at sub-block 822, the client device 102 may resume sending one or more messages destined for the server device 104, as needed. For example, the client device 102 may resume sending messages (e.g., RARs, N7 Notify messages, etc.) in response to receiving AARs from one or more P-CSCF nodes 500.

Figure 9:
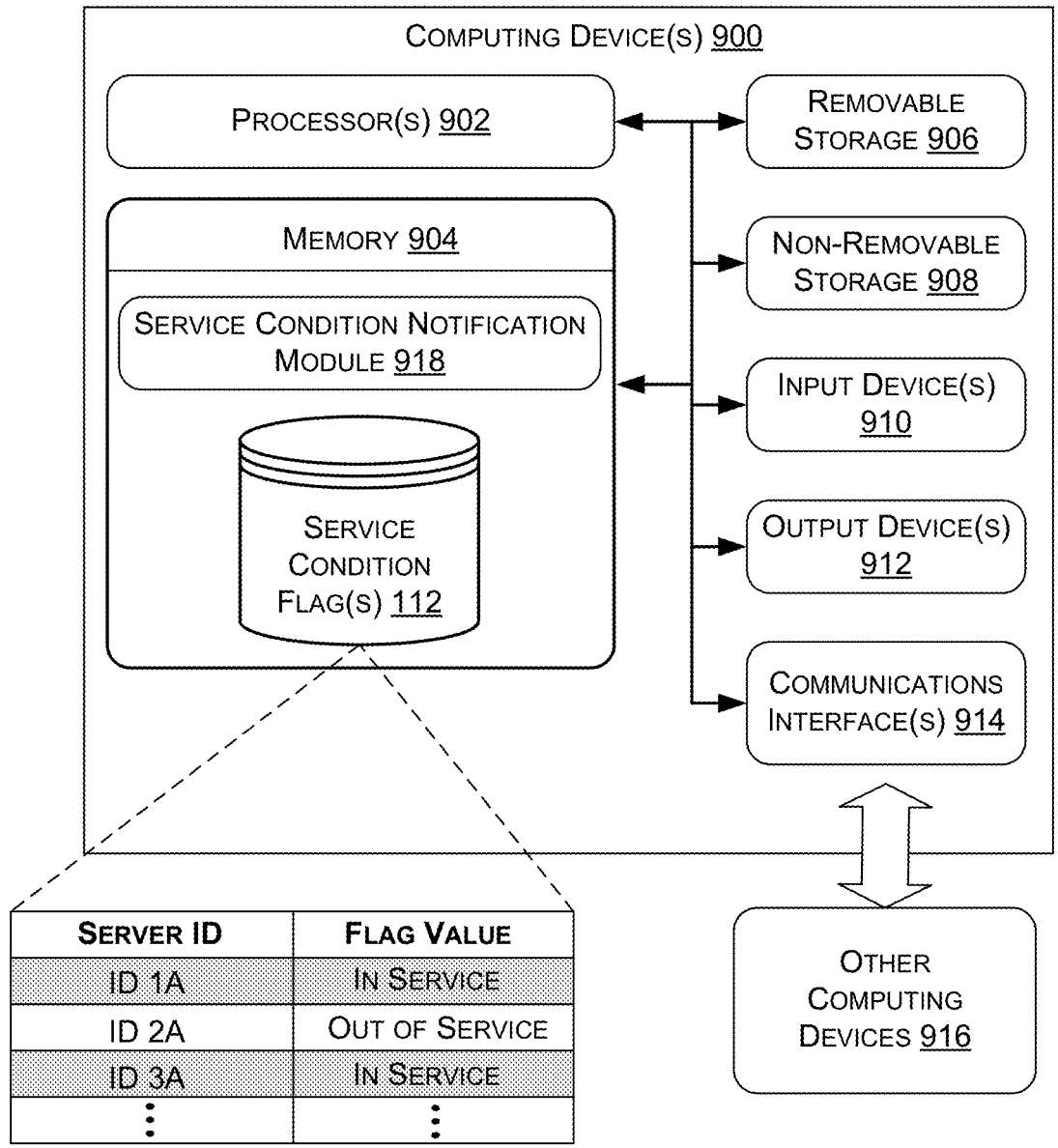
FIG. 9 is a block diagram of an example computing device(s) with logic to implement the techniques and processes described herein, according to various embodiments.

FIG. 9 is a block diagram of an example computing device(s) 900 with logic to implement the techniques and processes described herein, according to various embodiments. The computing device(s) 900 may be representative of the computing device 108 described herein, such as the DRA 208, the NRF 308, and/or the watchdog device 210, 310, and/or the computing device(s) 900 may be representative of the client device 102 (e.g., the PCRF 202, PCF 302, etc.) described herein.

As shown, the computing device(s) 900 may include one or more processors 902 and one or more forms of computer-readable memory 904. The computing device(s) 900 may also include additional storage devices. Such additional storage may include removable storage 906 and/or non-removable storage 908.

The computing device(s) 900 may further include input devices 910 (e.g., a touch screen, keypad, keyboard, mouse, pointer, microphone, etc.) and output devices 912 (e.g., a display, printer, speaker, etc.) communicatively coupled to the processor(s) 902 and the computer-readable memory 904. The computing device(s) 900 may further include communications interface(s) 914 that allow the computing device(s) 900 to communicate with other computing devices 916 (e.g., other network nodes, etc.) such as via a network. The communications interface(s) 914 may facilitate transmitting and receiving wired and/or wireless signals over any suitable communications/data technology, standard, or protocol, such as Global System for Mobile Communications (GSM), Time Division Multiple Access (TDMA), Universal Mobile Telecommunications System (UMTS), Evolution-Data Optimized (EVDO), LTE, Advanced LTE (LTE+), Generic Access Network (GAN), Unlicensed Mobile Access (UMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), Voice over IP (VoIP), VoLTE, IEEE 802.1x protocols, WiMAX, Wi-Fi, Data Over Cable Service Interface Specification (DOCSIS), digital subscriber line (DSL), and/ or any future IP-based network technology or evolution of an existing IP-based network technology, including 5G NR network protocols, and/or existing or legacy network technology, such as 2G, 3G, 4G, including circuit-switched networking protocols and/or packet-switched networking protocols.

In various embodiments, the computer-readable memory 904 comprises non-transitory computer-readable memory 904 that generally includes both volatile memory and non-volatile memory (e.g., random access memory (RAM), read-only memory (ROM), erasable programmable read-only memory (EEPROM), Flash Memory, miniature hard drive, memory card, optical storage, magnetic cassettes, magnetic tape, magnetic disk storage or other magnetic storage devices, or any other medium). The computer-readable memory 904 may also be described as computer storage media and may include volatile and nonvolatile, removable and non-removable media implemented in any method or technology for storage of information, such as computer readable instructions, data structures, program modules, or other data. Computer-readable memory 904, removable storage 906 and non-removable storage 908 are all examples of non-transitory computer-readable storage media. Computer-readable storage media include, but are not limited to, RAM, ROM, EEPROM, flash memory or other memory technology, compact disc read-only memory (CD-ROM), digital versatile disks (DVD) or other optical storage, magnetic cassettes, magnetic tape, magnetic disk storage or other magnetic storage devices, or any other medium which can be used to store the desired information and which can be accessed by the computing device(s) 900. Any such computer-readable storage media may be part of the computing device(s) 900.

The memory 904 can include a service condition notification module 918 (i.e., computer-executable instructions (or logic) that, when executed, by the processor(s) 902, perform the various acts and/or processes disclosed herein). For example, the service condition notification module 918 is configured to carry out a notification process, such as the process 700 described herein.

The memory 904 can further be used to store one or more service condition flags 112 (e.g., PGW service condition flags 212, SMF service condition flags 312, etc.), as described herein, which may be stored in a database (e.g., lookup table), an example of which is depicted in FIG. 9. For example, the table of service condition flags 212 may specify associations between server identifiers (e.g., host names) and the value to which the flag 112 is presently set (e.g., in service, out of service, etc.).

Figure 10:
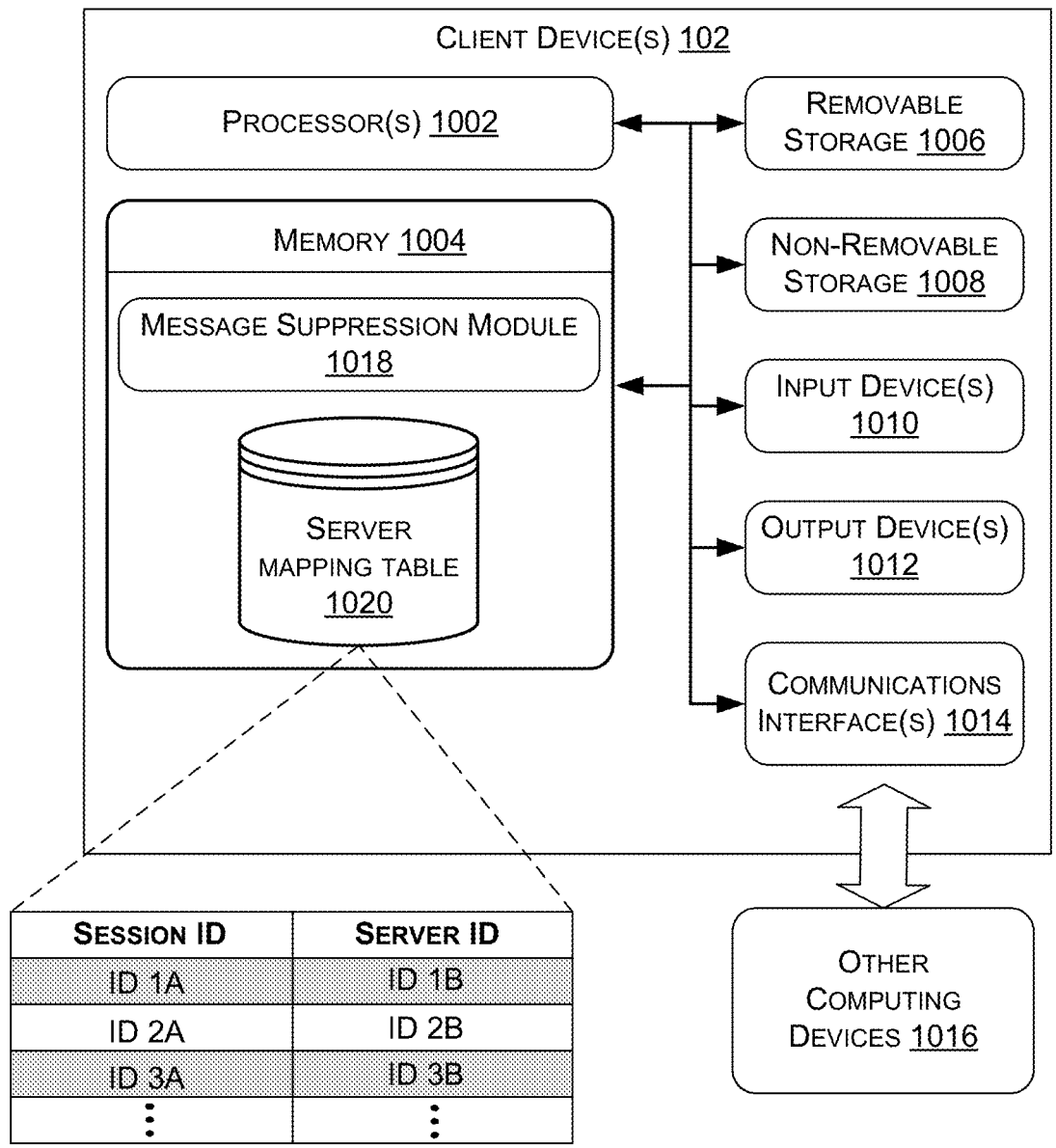
FIG. 10 is a block diagram of an example client device(s) with logic to implement the techniques and processes described herein, according to various embodiments.

FIG. 10 is a block diagram of an example client device(s) 102 with logic to implement the techniques and processes described herein, according to various embodiments. The client device(s) 102 may be implemented as any suitable type of computing device described herein, such as a PCRF 202, a PCF 302, a SMF 304, etc., which are all network elements, but which, in some cases, function as client devices 102 with respect to a server device 104. In some examples, the client device(s) 102 may be implemented as any suitable type of end-user device(s), such as a mobile phone (e.g., a smart phone/handset), a tablet computer, a laptop computer, a portable digital assistant (PDA), a wearable computer (e.g., electronic/smart glasses, a smart watch, fitness trackers, head-mounted display (HMD), etc.), an in-vehicle (e.g., in-car) computer, and/or any similar mobile device, as well as situated computing devices including, without limitation, a television (smart television), set-top-box (STB), desktop computer, an IoT client device, and the like.

As shown, the client device(s) 102 may include one or more processors 1002 and one or more forms of computer-readable memory 1004. The client device(s) 102 may also include additional storage devices. Such additional storage may include removable storage 1006 and/or non-removable storage 1008.

The client device(s) 102 may further include input devices 1010 (e.g., a touch screen, keypad, keyboard, mouse, pointer, microphone, etc.) and output devices 1012 (e.g., a display, printer, speaker, etc.) communicatively coupled to the processor(s) 1002 and the computer-readable memory 1004. The client device(s) 102 may further include communications interface(s) 1014 that allow the client device(s) 102 to communicate with other computing devices 1016 (e.g., other network nodes, a server device 104, etc.) such as via a network. The communications interface(s) 1014 may facilitate transmitting and receiving wired and/or wireless signals over any suitable communications/data technology, standard, or protocol, as described herein, such as those described above with respect to the communications interface(s) 914.

In various embodiments, the computer-readable memory 1004 comprises non-transitory computer-readable memory 1004 that generally includes both volatile memory and non-volatile memory (e.g., RAM, ROM, EEPROM, Flash Memory, miniature hard drive, memory card, optical storage, magnetic cassettes, magnetic tape, magnetic disk storage or other magnetic storage devices, or any other medium). The computer-readable memory 1004 may also be described as computer storage media and may include volatile and nonvolatile, removable and non-removable media implemented in any method or technology for storage of information, such as computer readable instructions, data structures, program modules, or other data. Computer-readable memory 1004, removable storage 1006 and non-removable storage 1008 are all examples of non-transitory computer-readable storage media. Computer-readable storage media include, but are not limited to, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the client device(s) 102. Any such computer-readable storage media may be part of the client device(s) 102.

The memory 1004 can include a message suppression module 1018 (i.e., computer-executable instructions (or logic) that, when executed, by the processor(s) 1002, perform the various acts and/or processes disclosed herein). For example, the message suppression module 1018 is configured to carry out message suppression processes, such as the process 800 described herein.

The memory 1004 can further be used to store a server mapping table 1020, which may specify associations between session identifiers (or UE identifiers) and server identifiers. The server mapping table 1020 may represent the PGW mapping table 514 or the SMF mapping table 614 described herein.

The environment and individual elements described herein may of course include many other logical, programmatic, and physical components, of which those shown in the accompanying figures are merely examples that are related to the discussion herein.

The various techniques described herein are assumed in the given examples to be implemented in the general context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

We claim:

1. A method comprising:
    sending, by a policy control function (PCF) or a policy and charging rules function (PCRF) node of a core network of a telecommunication service provider, a message to a gateway node of the core network;
    receiving, by the PCF or PCRF node, in response to the sending of the message to the gateway node, a notification indicating that the gateway node is at least partially out of service;
    receiving, by the PCF or PCRF node, from a proxy call session control function (P-CSCF) node, a second message to setup a communication session for a subscriber of the telecommunication service provider;
    refraining, by the PCF or PCRF node, based at least in part on the receiving of the notification and in response to receiving the second message, from sending one or more messages to the gateway node until the PCF or PCRF node is notified that the gateway node is back in service; and
    sending, by the PCF or PCRF node, to the P-CSCF node, an error code indicative of the gateway node being at least partially out of service and an identifier of the gateway node.

2. The method of claim 1, wherein the message is sent to the gateway node to setup a communication session for a subscriber of the telecommunication service provider.

3. The method of claim 1,
    wherein the sending of the error code comprises sending, by the PCF or PCRF node, to the P-CSCF node, the error code in response to the receiving of the second message.

4. The method of claim 1, wherein the PCF or PCRF node is indirectly connected to the gateway node via an intermediary device.

5. The method of claim 1, wherein:
    the gateway node comprises a session management function (SMF).

6. The method of claim 1, wherein:
    the gateway node comprises a packet data network gateway (PGW).

7. A policy control function (PCF) or a policy and charging rules function (PCRF) node of a core network of a telecommunication service provider, the PCF or PCRF node comprising:
    one or more processors; and
    computer-readable media storing computer-executable instructions that, when executed by the one or more processors, cause the one or more processors to:
        send a message to a gateway node of the core network;
        receive, in response to sending the message to the gateway node, a notification indicating that the gateway node is at least partially out of service;
        receiving, by the client device, from a proxy call session control function (P-CSCF) node, a second message to setup a communication session for a subscriber of the telecommunication service provider;
        refrain, based at least in part on receiving of the notification and in response to receiving the second message, from sending one or more messages to the gateway node until the PCF or PCRF node is notified that the gateway node is back in service; and
        send, to the P-CSCF node, an error code indicative of the gateway node being at least partially out of service and an identifier of the gateway node.

8. The client device of claim 7, wherein the computer-executable instructions, when executed by the one or more processors, further cause the one or more processors to, in response to the receiving of the notification, delete, from a database accessible to the PCF or PCRF node, one or more entries that indicate one or more associations between one or more session identifiers and the gateway node.

9. The client device of claim 7, wherein the receiving of the notification is based at least in part on a flag having been set to a value indicative of the gateway node being at least partially out of service.

10. The client device of claim 7, wherein the notification is received from at least one of a Diameter routing agent (DRA), a watchdog device, or a network repository function (NRF).

11. The client device of claim 7, wherein the notification is a first notification, and the computer-executable instructions, when executed by the one or more processors, further cause the one or more processors to:
receive a second notification indicating that the gateway node is back in service; and
resume, in response to receiving the second notification, sending one or more additional messages to the gateway node.

12. The client device of claim 7, wherein:
the gateway node comprises a session management function (SMF).

13. One or more non-transitory computer-readable media storing computer-executable instructions that, when executed by one or more processors of a policy control function (PCF) or a policy and charging rules function (PCRF) node of a core network of a telecommunication service provider, cause performance of operations comprising:
sending a message to a gateway node of the core network;
receiving, in response to sending the message to the gateway node, a notification indicating that the gateway node is at least partially out of service;
receiving, by the PCF or PCRF node, from a proxy call session control function (P-CSCF) node, a second message to setup a communication session for a subscriber of the telecommunication service provider;
suppressing, based at least in part on receiving of the notification and in response to receiving the second message, one or more messages destined for the gateway node until the PCF or PCRF node is notified that the gateway node is back in service; and
sending, to the P-CSCF node, an error code indicative of the gateway node being at least partially out of service and an identifier of the gateway node.

14. The one or more non-transitory computer-readable media of claim 13, wherein:
the gateway node comprises a session management function (SMF).

15. The one or more non-transitory computer-readable media of claim 13, wherein the message is sent to the gateway node to setup a communication session for a subscriber of the telecommunication service provider.

\* \* \* \* \*